United States Patent
Li et al.

(10) Patent No.: US 10,362,455 B2
(45) Date of Patent: Jul. 23, 2019

(54) MESSAGE PUSHING AND DISPLAYING METHOD AND APPARATUS

(71) Applicant: HUAWEI TECHNOLOGIES CO., LTD, Shenzhen (CN)

(72) Inventors: Ru Li, Shenzhen (CN); Huangwei Wu, Shenzhen (CN); Xi Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/311,450

(22) PCT Filed: Aug. 29, 2014

(86) PCT No.: PCT/CN2014/085475
§ 371 (c)(1),
(2) Date: Nov. 15, 2016

(87) PCT Pub. No.: WO2016/029417
PCT Pub. Date: Mar. 3, 2016

(65) Prior Publication Data
US 2017/0094484 A1  Mar. 30, 2017

(51) Int. Cl.
*H04W 4/12* (2009.01)
*H04L 29/08* (2006.01)
(Continued)

(52) U.S. Cl.
CPC .......... *H04W 4/12* (2013.01); *G06Q 30/0251* (2013.01); *H04H 20/61* (2013.01);
(Continued)

(58) Field of Classification Search
CPC .......... H04W 4/12; H04W 4/16; H04L 54/24; H04L 67/26
See application file for complete search history.

(56) References Cited

U.S. PATENT DOCUMENTS

| 9,603,013 B2 * | 3/2017 | Niewczas ............. H04W 12/06 |
| 2013/0226704 A1 * | 8/2013 | Fernandez ......... G06Q 30/0261 705/14.58 |

(Continued)

FOREIGN PATENT DOCUMENTS

| CN | 102542181 A | 7/2012 |
| CN | 103856916 A | 6/2014 |

(Continued)

OTHER PUBLICATIONS

Extended European Search Report issued in European Application No. 14900590.2, dated Apr. 3, 2017, 8 pages.
(Continued)

*Primary Examiner* — Asghar H Bilgrami
(74) *Attorney, Agent, or Firm* — Fish & Richardson P.C.

(57) ABSTRACT

Embodiments of the present invention provide a displaying method and apparatus relate to the field of mobile applications, where the method includes: receiving a first notification message sent by a first server, wherein the first server is corresponding to a first application program associated with a universally unique identifier of a first signal transmitter device; determining strength of a received signal sent by the first signal transmitter device; and determining a display manner according to the strength of the signal sent by the first signal transmitter device, and displaying the first notification message in the display manner.

8 Claims, 14 Drawing Sheets

(51) Int. Cl.
  *H04L 12/58* (2006.01)
  *H04W 4/30* (2018.01)
  *G06Q 30/02* (2012.01)
  *H04H 20/61* (2008.01)
  *H04W 64/00* (2009.01)
  *H04H 60/52* (2008.01)
  *H04W 88/02* (2009.01)
  *H04W 4/80* (2018.01)

(52) U.S. Cl.
  CPC ............. *H04H 60/52* (2013.01); *H04L 51/24* (2013.01); *H04L 67/26* (2013.01); *H04W 4/30* (2018.02); *H04W 64/00* (2013.01); *H04W 4/80* (2018.02); *H04W 88/02* (2013.01)

(56) References Cited

U.S. PATENT DOCUMENTS

| | | | | |
|---|---|---|---|---|
| 2013/0281084 A1* | 10/2013 | Batada | ................. | H04W 4/043 455/426.1 |
| 2014/0073252 A1 | 3/2014 | Lee et al. | | |
| 2014/0113558 A1* | 4/2014 | Varoglu | ................. | H04W 12/08 455/41.2 |
| 2014/0135042 A1* | 5/2014 | Buchheim | ................. | G01S 1/68 455/456.6 |
| 2016/0055428 A1* | 2/2016 | Raina | .................... | H04L 63/107 705/5 |

FOREIGN PATENT DOCUMENTS

| | | |
|---|---|---|
| CN | 103995251 A | 8/2014 |
| CN | 104008498 A | 8/2014 |
| EP | 2750414 A1 | 7/2014 |

OTHER PUBLICATIONS

International Search Report in International Application No. PCT/CN2014/085475, 4 pages.
International Search Report issued in International Application No. PCT/CN2014/085475, dated May 22, 2015, 4 pages.
Chinese Office Action issued in Chinese Application No. 201480039298.5 dated Sep. 29, 2018, 6 pages.

* cited by examiner

MESSAGE PUSHING AND DISPLAYING METHOD AND APPARATUS

CROSS-REFERENCE TO RELATED APPLICATIONS

This application is a national stage of International Application No. PCT/CN2014/085475, filed on Aug. 29, 2014, which is hereby incorporated by reference in its entirety.

TECHNICAL FIELD

The present invention relates to the field of mobile applications, and in particular, to a message pushing and displaying method and apparatus.

BACKGROUND

As positioning technologies develop, currently it is very easy to attract a customer to a store by using a global positioning system (Global Positioning System, "GPS" for short) service on a mobile terminal. However, when GPS works indoors, a signal attenuates greatly because of impact of a building. Therefore, indoor positioning accuracy of the GPS service becomes very low. How to accurately locate indoors? An iBeacon technology has been proposed for the first time on the "Worldwide Developers Conference" (Worldwide Developers Conference, "WWDC" for short) of Apple Inc. in 2013, and can help a merchant to obtain a specific indoor position of a customer. According to the iBeacon technology, multiple iBeacon transceivers are disposed indoors, and a user can be located with precision measured in feet. The positioning technology is referred to as "microlocation" (microlocation) in the industry.

The iBeacon technology features in locating a user and transmitting data in the background in real time. A merchant may send related information to a smart phone of a customer by learning a position of the customer. Therefore, the user can read interested content only by taking out a mobile phone from a pocket. Recently, in a small bar named "The Bar Kick" in London, England, this technology is used to improve consumer experience, and each customer within the bar can read two latest versions of popular magazines for free in a newspaper application in a mobile phone. In the well-known Citi Field in New York, this technology has been used to start a test for pushing video, a hot dog coupon, and a seat navigation service to audience in the field.

Specifically, on a terminal, an Apple iOS8 device may receive a broadcast message, send a parsed broadcast message to all application programs waiting for the broadcast message, and an application program determines whether the broadcast message is sent to the application program itself. The iBeacon technology is used by Apple Inc. to push a geographic-position-based application notification to a lock screen interface of the iOS8 device. These notification icons are located on a lower left side of the lock screen interface. A user can touch and hold the small icon and slide upwards to unlock the device to start the application. For example, when a user takes an iOS8 device to Starbucks, an application program of the Starbucks appears on a lower left corner of a lock screen interface, the user can directly start the application program by touching and holding the application program and sliding upwards, which is similar to starting a camera application program in a lock screen interface. In addition, even though the user does not install a particular application, in a particular position, the iOS8 device still recommends the application to the user, and an application installation interface in the App Store is entered after opening.

During implementation of the present invention, the inventor finds that the prior art has the following problem:

In a case in which an application program has been purchased, a user needs to tap and slide to start the application program, and knows a notification message of a store only after entering the application program, and the operation is complex.

SUMMARY

To resolve a problem existing in the prior art, embodiments of the present invention provide a message pushing and displaying method and apparatus. Technical solutions are as follows:

According to an aspect, an embodiment of the present invention provides a message pushing method, where the method includes:

storing a universally unique identifier, associated with at least one application program, of at least one signal transmitter device;

receiving a first broadcast message sent by a first signal transmitter device, where the first broadcast message includes a universally unique identifier of the first signal transmitter device;

sending, according to the universally unique identifier of the first signal transmitter device, request information to a first server corresponding to a first application program associated with the universally unique identifier of the first signal transmitter device, where the request information includes the universally unique identifier of the first signal transmitter device; and receiving and displaying a first notification message that is sent by the first server according to the request information.

In one implementation manner of this embodiment of the present invention, the receiving and displaying a first notification message that is sent by the first server according to the request information includes:

receiving the first notification message that is sent by the first server according to the request information;

receiving a second broadcast message sent by the first signal transmitter device; and determining a display manner of the first notification message according to signal strength of the second broadcast message.

In another implementation manner of this embodiment of the present invention, the determining a display manner of the first notification message according to signal strength of the second broadcast message includes:

determining a first distance between a mobile terminal and the first signal transmitter device according to the signal strength of the second broadcast message; and displaying the first notification message on a screen of the mobile terminal in a first manner when the first distance between the mobile terminal and the first signal transmitter device is less than or equal to a first distance threshold, or displaying the first notification message on a screen of the mobile terminal in a second manner when the first distance between the mobile terminal and the first signal transmitter device is greater than the first distance threshold, where the first manner is different from the second manner.

In another implementation manner of this embodiment of the present invention, the method further includes:

receiving a third broadcast message sent by a second signal transmitter device, where the third broadcast message includes a universally unique identifier of the second signal transmitter device;

sending, according to the universally unique identifier of the second signal transmitter device, request information to a second server corresponding to a second application program associated with the universally unique identifier of the second signal transmitter device, where the request information includes the universally unique identifier of the second signal transmitter device;

receiving a second notification message sent by the second server;

receiving a fourth broadcast message sent by the second signal transmitter device;

determining a second distance between the mobile terminal and the second signal transmitter device according to signal strength of the fourth broadcast message;

determining a display manner of the second notification message according to the second distance between the mobile terminal and the second signal transmitter device; and when the display manner of the first notification message is the same as that of the second notification message, arranging display orders of the first notification message and the second notification message according to the first distance and the second distance, or arranging display orders of the first notification message and the second notification message according to receiving time of the first notification message and the second notification message.

In another implementation manner of this embodiment of the present invention, the sending request information to a first server corresponding to a first application program associated with the universally unique identifier of the first signal transmitter device includes:

directly sending the request information to the first application program associated with the universally unique identifier of the first signal transmitter device, so that the first application program sends the request information to the first server corresponding to the first application program.

In another implementation manner of this embodiment of the present invention, the sending request information to a first server corresponding to a first application program associated with the universally unique identifier of the first signal transmitter device includes:

obtaining a device identifier of a mobile terminal; and sending the request information and the device identifier to a push notification server, so that the push notification server sends the request information and the device identifier to the first server.

According to another aspect, an embodiment of the present invention further provides a message pushing apparatus, where the apparatus includes:

a storage module, configured to store a universally unique identifier, associated with at least one application program, of at least one signal transmitter device;

a receiving module, configured to receive a first broadcast message sent by a first signal transmitter device, where the first broadcast message includes a universally unique identifier of the first signal transmitter device;

a processing module, configured to send, according to the universally unique identifier of the first signal transmitter device, request information to a first server corresponding to a first application program associated with the universally unique identifier of the first signal transmitter device, where the request information includes the universally unique identifier of the first signal transmitter device; and an output module, configured to receive and display a first notification message that is sent by the first server according to the request information.

In one implementation manner of this embodiment of the present invention, the output module includes:

a first receiving unit, configured to receive the first notification message that is sent by the first server according to the request information;

a second receiving unit, configured to receive a second broadcast message sent by the first signal transmitter device; and a processing unit, configured to determine a display manner of the first notification message according to signal strength of the second broadcast message.

In another implementation manner of this embodiment of the present invention, the processing unit includes:

a determining subunit, configured to determine a first distance between a mobile terminal and the first signal transmitter device according to the signal strength of the second broadcast message; and a processing subunit, configured to: display the first notification message on a screen of the mobile terminal in a first manner when the first distance between the mobile terminal and the first signal transmitter device is less than or equal to a first distance threshold, or display the first notification message on a screen of the mobile terminal in a second manner when the first distance between the mobile terminal and the first signal transmitter device is greater than the first distance threshold, where the first manner is different from the second manner.

In another implementation manner of this embodiment of the present invention, the receiving module is further configured to receive a third broadcast message sent by a second signal transmitter device, where the third broadcast message includes the universally unique identifier of the first signal transmitter device;

the processing module is further configured to send, according to a universally unique identifier of the second signal transmitter device, request information to a second server corresponding to a second application program associated with the universally unique identifier of the second signal transmitter device, where the request information includes the universally unique identifier of the second signal transmitter device;

the first receiving unit is further configured to receive a second notification message sent by the second server;

the second receiving unit is further configured to receive a fourth broadcast message sent by the second signal transmitter device;

the determining subunit is further configured to determine a second distance between the mobile terminal and the second signal transmitter device according to signal strength of the fourth broadcast message; and the processing subunit is further configured to: determine a display manner of the second notification message according to the second distance between the mobile terminal and the second signal transmitter device, and when the display manner of the first notification message is the same as that of the second notification message, arrange display orders of the first notification message and the second notification message according to the first distance and the second distance, or arrange display orders of the first notification message and the second notification message according to receiving time of the first notification message and the second notification message.

In another implementation manner of this embodiment of the present invention, the processing module includes:

a first sending unit, configured to directly send the request information to the first application program associated with the universally unique identifier of the first signal transmitter device, so that the first application program sends the request information to the first server corresponding to the first application program.

In another implementation manner of this embodiment of the present invention, the processing module includes:

a search unit, configured to obtain a device identifier of a mobile terminal; and a second sending unit, configured to send the request information and the device identifier to a first push notification server, so that the push notification server sends the request information and the device identifier to the first server.

According to another aspect, an embodiment of the present invention further provides a message pushing apparatus, where the apparatus includes a processor unit, a storage unit, a communications unit, an output unit, and a bus; the storage unit is configured to store computer execution instructions; the processor unit and the storage unit are connected by using the bus; and when the computer is running, the processor unit executes the computer execution instructions stored in the storage unit, so that the computer executes the method according to any one of the foregoing.

According to another aspect, an embodiment of the present invention further provides a message displaying method, where the method includes:

receiving a first notification message sent by a first server, where the first server is corresponding to a first application program associated with a universally unique identifier of a first signal transmitter device;

determining strength of a received signal sent by the first signal transmitter device; and determining a display manner according to the strength of the signal sent by the first signal transmitter device, and displaying the first notification message in the display manner.

In one implementation manner of this embodiment of the present invention, the determining a display manner according to the strength of the signal sent by the first signal transmitter device, and displaying the first notification message in the display manner include:

determining a first distance between a mobile terminal and the first signal transmitter device according to the strength of the received signal sent by the first signal transmitter device; and displaying the first notification message on a screen of the mobile terminal in a first manner when the first distance between the mobile terminal and the first signal transmitter device is less than or equal to a first distance threshold, or displaying the first notification message on a screen of the mobile terminal in a second manner when the first distance between the mobile terminal and the first signal transmitter device is greater than the first distance threshold, where the first manner is different from the second manner.

In another implementation manner of this embodiment of the present invention, the method further includes:

receiving a second notification message sent by a second server, where the second server is corresponding to an application program associated with a universally unique identifier of a second signal transmitter device;

determining a second distance between the mobile terminal and the second signal transmitter device according to a received signal sent by the second signal transmitter device;

determining a display manner of the second notification message according to the second distance between the mobile terminal and the second signal transmitter device; and when the display manner of the first notification message is the same as that of the second notification message, arranging display orders of the first notification message and the second notification message according to the first distance and the second distance, or arranging display orders of the first notification message and the second notification message according to receiving time of the first notification message and the second notification message.

In another implementation manner of this embodiment of the present invention, the determining a display manner according to the signal strength of the first signal transmitter device, and displaying the first notification message in the display manner further include:

not displaying the first notification message on the screen of the mobile terminal when the first distance between the mobile terminal and the first signal transmitter device is greater than a second distance threshold, where the second distance threshold is greater than the first distance threshold.

According to another aspect, an embodiment of the present invention further provides a message displaying apparatus, where the apparatus includes:

a receiving module, configured to receive a first notification message sent by a first server, where the first server is corresponding to a first application program associated with a universally unique identifier of a first signal transmitter device;

a determining module, configured to determine strength of a received signal sent by the first signal transmitter device; and an output module, configured to determine a display manner according to the signal strength of the first signal transmitter device, and display the first notification message in the display manner.

In one implementation manner of this embodiment of the present invention, the output module includes:

a determining unit, configured to determine a first distance between a mobile terminal and the first signal transmitter device according to the strength of the received signal sent by the first signal transmitter device; and a processing unit, configured to: display the first notification message on a screen of the mobile terminal in a first manner when the first distance between the mobile terminal and the first signal transmitter device is less than or equal to a first distance threshold, or display the first notification message on a screen of the mobile terminal in a second manner when the first distance between the mobile terminal and the first signal transmitter device is greater than a first distance threshold, where the first manner is different from the second manner.

In another implementation manner of this embodiment of the present invention, the receiving module is further configured to receive a second notification message sent by a second server, where the second server is corresponding to an application program associated with a universally unique identifier of a second signal transmitter device;

the determining unit is further configured to determine a second distance between the mobile terminal and the second signal transmitter device according to strength of a received signal sent by the second signal transmitter device; and the processing unit is further configured to: determine a display manner of the second notification message according to the second distance between the mobile terminal and the second signal transmitter device, and when the display manner of the first notification message is the same as that of the second notification message, arrange display orders of the first notification message and the second notification message according to the first distance and the second distance, or arrange display orders of the first notification message and the second notification message according to receiving time of the first notification message and the second notification message.

In another implementation manner of this embodiment of the present invention, the processing unit is further configured to: not display the first notification message on the screen of the mobile terminal when the first distance between the mobile terminal and the first signal transmitter device is greater than a second distance threshold, where the second distance threshold is greater than the first distance threshold.

According to another aspect, an embodiment of the present invention further provides a message displaying apparatus, where the apparatus includes a processor unit, a storage unit, a communications unit, an output unit, and a bus; the storage unit is configured to store computer execution instructions; the processor unit and the storage unit are connected by using the bus; and when the computer is running, the processor unit executes the computer execution instructions stored in the storage unit, so that the computer executes the method according to any one of the foregoing.

Beneficial effects of the technical solutions provided in the embodiments of the present invention are as follows:

A universally unique identifier, associated with at least one application program, of at least one signal transmitter device is stored; after a first broadcast message sent by a first signal transmitter device is received, request information is sent, according to a universally unique identifier of the first signal transmitter device in the broadcast message, to a first server corresponding to a first application program associated with the universally unique identifier of the first signal transmitter device, where the request information includes the universally unique identifier of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
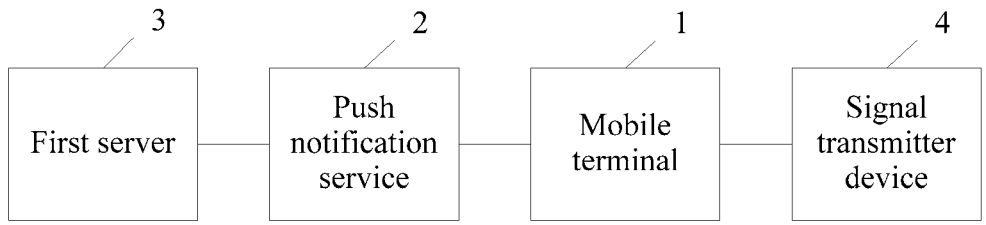
FIG. 1 is an application scenario diagram according to an embodiment of the present invention.

For ease of describing the embodiments, the following first briefly describes an application scenario of the embodiments of the present invention. Referring to FIG. 1, the scenario includes a mobile terminal 1, a push notification server 2, a first server 3, and a signal transmitter device 4. Multiple signal transmitter devices 4 are installed indoors. The signal transmitter device 4 equipped with a low-power Bluetooth communication function uses a low-power Bluetooth technology to send, to the surround, a distinctive universally unique identifier (Universally Unique Identifier, "UUID" for short) of the signal transmitter device 4. After receiving the UUID, the mobile terminal 1 interacts with the first server 3 and the push notification server 2 to obtain a message pushed by the push notification server 2.

The mobile terminal 1 includes but is not limited to a mobile phone, a mobile computer, a tablet computer, a personal digital assistant (Personal Digital Assistant, PDA), a media player, a smart phone, a smart television, a smart watch, smart glasses, a smart band, and the like, for example, an iOS8 device. The push notification server 2 may be an Apple Push Notification Service (Apple Push Notification Service, "APNs" for short) server. The signal transmitter device 4 may be an iBeacon transmitter. The foregoing devices transmit data to each other by using a wireless network.

It should be noted that the foregoing device types and connection manner are merely examples, which is not limited in the present invention.

Embodiment 1

Figure 2:
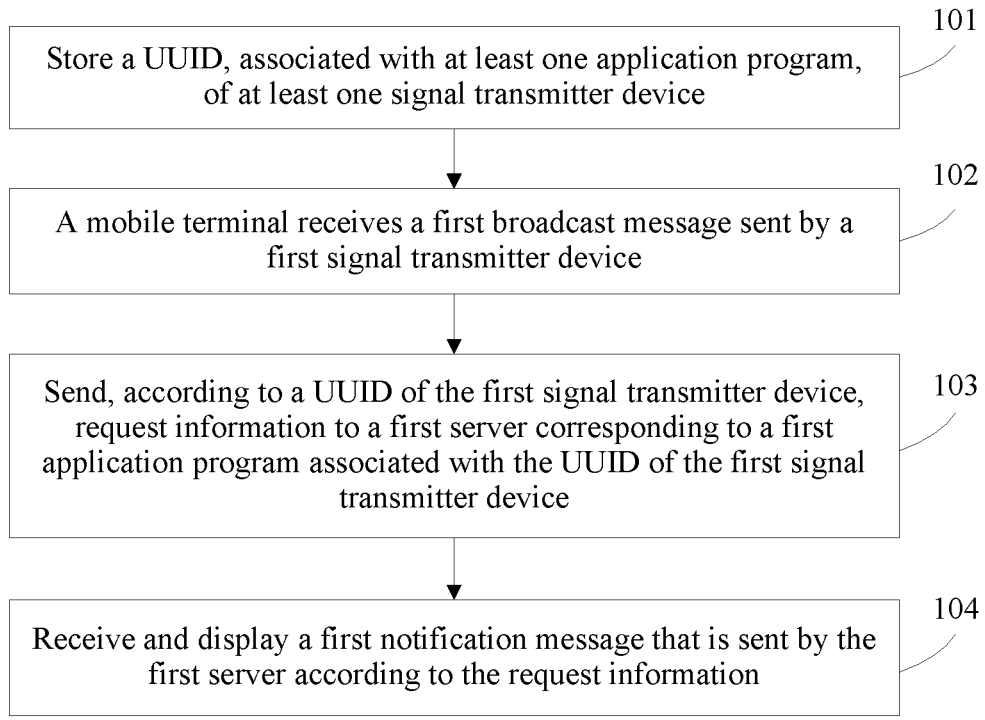
FIG. 2 is a flowchart of a message pushing method according to Embodiment 1 of the present invention.

This embodiment of the present invention provides a message pushing method, which is applied to a mobile terminal. Referring to FIG. 2, the method includes:

Step 101: Store a UUID, associated with at least one application program, of at least one signal transmitter device.

The signal transmitter device may be an iBeacon transmitter, a global positioning system (Global Positioning System, "GPS" for short) signal transmitter device, a Wireless Fidelity (Wireless Fidelity, "Wi-Fi" for short) signal transmitter device, a base station, or the like.

In specific implementation, an association between an application program and a UUID of a signal transmitter device may be stored by using a database. The database may be stored locally or stored on a first server, so that the mobile terminal can perform a real-time query.

It is easy to know that one application program may be associated with a UUID of one or more signal transmitter devices, and the association may be stored in the database in a list manner, which is shown in the following table, but not limited to this form:

| Application program | UUID |
| --- | --- |
| Application program 1 | UUID 1 |
|  | ... |
|  | UUID n |
| Application program 2 | UUID' 1 |
|  | ... |
|  | UUID' n |
| Application program n | UUID" 1 |
|  | ... |
|  | UUID" n |

Step 102: The mobile terminal receives a first broadcast message sent by a first signal transmitter device, where the first broadcast message includes a UUID of the first signal transmitter device.

The UUID is used to identify an enterprise or a store to which the first signal transmitter device belongs, and the UUID is a 128-bit identifier. The first broadcast message may further include other fields, for example, a signal strength field, a Major (major) field, and a Minor (minor) field. Signal strength is used to identify a distance between the first signal transmitter device and the mobile terminal. The distance between the first signal transmitter device and the mobile terminal may be determined according to the signal strength in the received first broadcast message. Major and Minor are 16-bit identifiers set by a publisher, and may be empty.

After receiving the first broadcast information, the mobile terminal parses the first broadcast message to obtain the UUID and the signal strength. Parsing the first broadcast message belongs to the prior art, and details are not described herein.

Step 103: Send, according to the UUID of the first signal transmitter device, request information to a first server corresponding to a first application program associated with the UUID of the first signal transmitter device, where the request information includes the UUID of the first signal transmitter device.

The UUID carried in the request information may enable the first server to send to the first signal transmitter device corresponding to the UUID.

Step 104: Receive and display a first notification message that is sent by the first server according to the request information.

Content of the first notification message includes discount information, an advertisement push, or a store position. Certainly, in this embodiment, the first notification message may further include other content, which is not limited in this application.

Specifically, when the first server is used to send the first notification message, the content of the first notification message may be determined according to the signal strength. For example, when the signal strength shows that there is a long distance between the mobile terminal (a customer) and a first device (a store), a first notification message including a store position may be sent to guide the customer towards the store; when the signal strength shows that there is a short distance between the mobile terminal (a customer) and a first device (a store), a first notification message including discount information may be sent to guide the customer towards consumption.

In this embodiment, when the mobile terminal is in a lock screen state, the first notification message is directly displayed in a lock screen interface.

In this embodiment of the present invention, a UUID, associated with at least one application program, of at least one signal transmitter device is stored; after a first broadcast message sent by a first signal transmitter device is received, request information is sent, according to a UUID of the first signal transmitter device in the broadcast message, to a first server corresponding to a first application program associated with the UUID of the first signal transmitter device, where the request information includes the UUID of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient.

Embodiment 2

Figure 3:
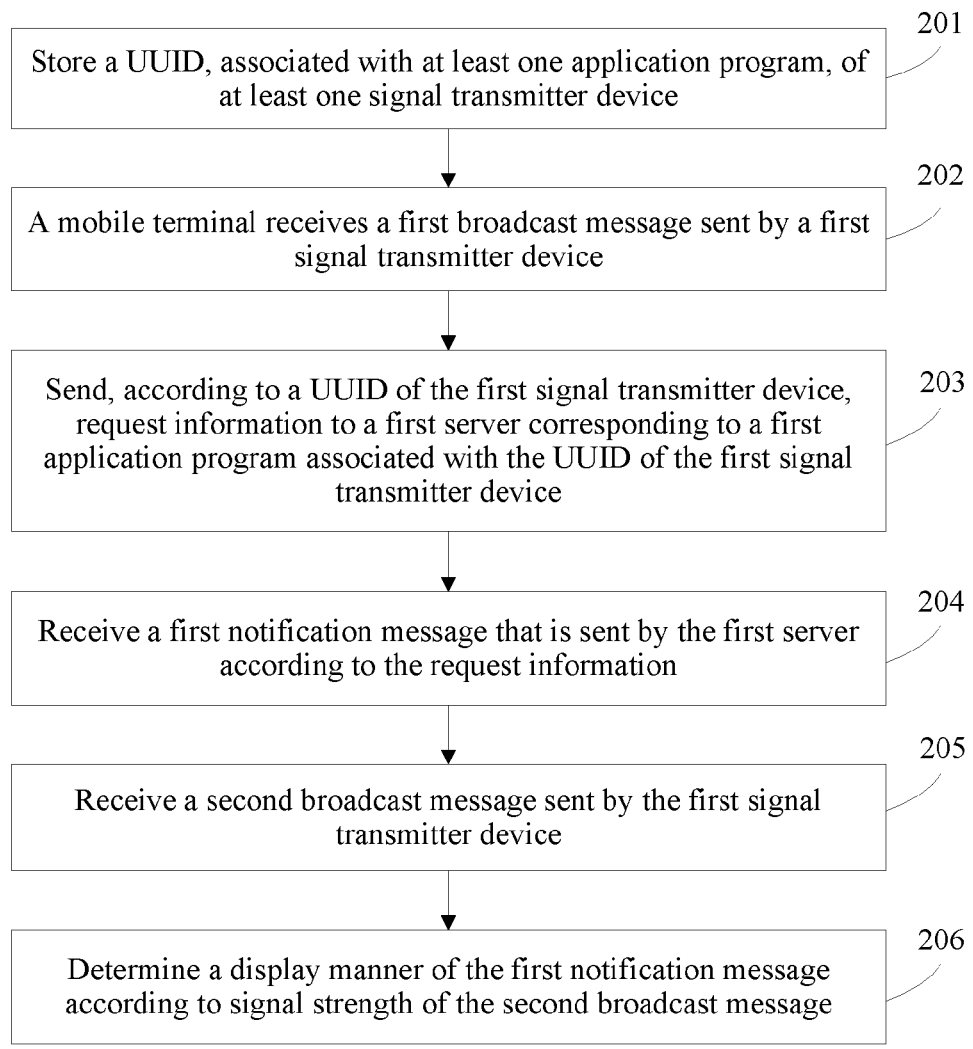
FIG. 3 is a flowchart of a message pushing method according to Embodiment 2 of the present invention.

This embodiment of the present invention provides a message pushing method, which is applied to a mobile terminal. Referring to FIG. 3, the method includes:

Step 201: The mobile terminal stores a UUID, associated with at least one application program, of at least one signal transmitter device.

The signal transmitter device may be an iBeacon transmitter, a GPS signal transmitter device, a Wi-Fi signal transmitter device, a base station, or the like.

In specific implementation, an association between an application program and a UUID of a signal transmitter device may be stored by using a database. The database may be stored locally or stored on a first server, so that the mobile terminal can perform a real-time query.

It is easy to know that one application program may be associated with a UUID of one or more signal transmitter devices, and the association may be stored in the database in a list manner, which is shown in the following table, but not limited to this form:

| Application program | UUID |
| --- | --- |
| Application program 1 | UUID 1 |
|  | ... |
|  | UUID n |
| Application program 2 | UUID' 1 |
|  | ... |
|  | UUID' n |
| Application program n | UUID" 1 |
|  | ... |
|  | UUID" n |

Step 202: Receive a first broadcast message sent by a first signal transmitter device, where the first broadcast message includes signal strength and a UUID of the first signal transmitter device.

The UUID is used to identify an enterprise or a store to which the first signal transmitter device belongs, and the UUID is a 128-bit identifier. The signal strength is used to identify a distance between the first signal transmitter device and the mobile terminal. The distance between the first signal transmitter device and the mobile terminal may be determined according to the signal strength in the received broadcast message. In addition to the foregoing two fields, the first broadcast message may further include a Major field and a Minor field. Major and Minor are 16-bit identifiers set by a publisher, and may be empty.

After receiving the first broadcast information, the mobile terminal parses the first broadcast message to obtain the UUID and the signal strength. Parsing the first broadcast message belongs to the prior art, and details are not described herein.

Step 203: Send, according to the UUID of the first signal transmitter device, request information to a first server corresponding to a first application program associated with the UUID of the first signal transmitter device, where the request information includes the UUID of the first signal transmitter device.

The UUID carried in the request information may enable the first server to send to the first signal transmitter device corresponding to the UUID.

In one implementation manner of this embodiment of the present invention, the sending request information to a first server corresponding to a first application program associated with the UUID of the first signal transmitter device may be implemented in the following manner:

directly sending the request information to the first application program associated with the UUID of the first signal transmitter device, so that the first application program sends the request information to the first server corresponding to the first application program.

In another implementation manner of this embodiment of the present invention, the sending request information to a first server corresponding to a first application program associated with the UUID of the first signal transmitter device may be implemented in the following manner:

obtaining a device identifier of the mobile terminal; and sending the request information and the device identifier to a push notification server, so that the push notification server sends the request information and the device identifier to the first server.

Step 204: Receive a first notification message that is sent by the first server according to the request information.

Content of the first notification message includes discount information, an advertisement push, or a store position. Certainly, in this embodiment, the first notification message may further include other content, which is not limited in this application.

The content of the first notification message is determined by the first server according to the signal strength. The first notification message may be fully used to provide a correct guide for a customer.

Specifically, when sending the first notification message, the first server may determine the content of the first notification message according to the signal strength. For example, when the signal strength shows that there is a long distance between the mobile terminal (a customer) and the first signal transmitter device (a store) (that is, the signal strength is in a second specified range), a first notification message including a store position may be sent to guide the customer towards the store; when the signal strength shows that there is a short distance between the mobile terminal (a customer) and the first signal transmitter device (a store) (that is, the signal strength is in a first specified range), a first notification message including discount information may be sent to guide the customer towards consumption.

Step 205: Receive a second broadcast message sent by the first signal transmitter device.

Step 206: Determine a display manner of the first notification message according to signal strength of the second broadcast message.

The display manner of the first notification message is herein determined according to the signal strength of the second broadcast message because a most accurate first distance between the mobile terminal and the first signal transmitter device is determined according to the signal strength of the second broadcast message. Certainly, in this embodiment, the display manner of the first notification message may be determined by using the signal strength of the first broadcast message or of another broadcast message.

Specifically, step 206 may be implemented in the following manner:

determining a first distance between the mobile terminal and the first signal transmitter device according to the signal strength of the second broadcast message; and displaying the first notification message on a screen of the mobile terminal in a first manner when the first distance between the mobile terminal and the first signal transmitter device is less than or equal to a first distance threshold, or displaying the first notification message on a screen of the mobile terminal in a second manner when the first distance between the mobile terminal and the first signal transmitter device is greater than a first distance threshold, where the first manner is different from the second manner.

Further, the method further includes:

not displaying the first notification message on the screen of the mobile terminal when the first distance between the mobile terminal and the first signal transmitter device is greater than a second distance threshold, where the second distance threshold is greater than the first distance threshold, and the first distance threshold is greater than 0.

Further, the method may further include:

receiving a third broadcast message sent by a second signal transmitter device, where the third broadcast message includes a UUID of the second signal transmitter device;

sending, according to the UUID of the second signal transmitter device, request information to a second server corresponding to a second application program associated with the UUID of the second signal transmitter device, where the request information includes the UUID of the second signal transmitter device;

receiving a second notification message sent by the second server;

receiving a fourth broadcast message sent by the second signal transmitter device;

determining a second distance between the mobile terminal and the second signal transmitter device according to signal strength of the fourth broadcast message;

determining a display manner of the second notification message according to the second distance between the mobile terminal and the second signal transmitter device; and when the display manner of the first notification message is the same as that of the second notification message, arranging display orders of the first notification message and the second notification message according to the first distance and the second distance, or arranging display orders of the first notification message and the second notification message according to receiving time of the first notification message and the second notification message.

Specifically, sorting according to the receiving time of the first notification message and the second notification message may be sorting the earlier received first notification message first, or sorting in a reverse order. Certainly, in addition to the sorting according to the receiving time of the first notification message, sorting may further be performed according to time for setting up a connection between the mobile terminal and a signal transmitter device. Sorting according to the first distance and the second distance may be preferably sorting a longer distance first, or sorting in a reverse order.

In this embodiment, the first manner may be outputting both an application program icon and a notification message; and the second manner may be outputting an application program icon, but not outputting a notification message.

Specifically, the outputting an application program icon and a notification message refers to displaying the application program icon and the notification message in a lock screen interface of the mobile terminal, so that in a lock screen state, a user can directly tap the application program icon and the notification message for reading.

Output on the mobile terminal also includes two cases: In a first case, the application program icon and the notification message are not displayed on the screen of the mobile terminal currently; and in a second case, the application program icon and the notification message are already displayed on the screen of the mobile terminal currently. For the first case, both the application program icon and the notification message can be directly displayed on the screen of the mobile terminal. For the second case, if it is determined that both an application program icon and a notification message are output, a new notification message is added on the screen; if it is determined that an application program icon is output, but a notification message is not output, the notification message on the screen is deleted.

Further, when it is determined that an application program icon is output, but a notification message is not output, the mobile terminal may further be controlled not to receive a notification message sent by an application program server corresponding to the application program.

The following further describes step 206 by using an example:

A distance between the first signal transmitter device and the mobile terminal is divided into Immediate (Immediate), Near (Near), Far (Far), and Unknown (Unknow). The distance Immediate and the distance Near are less than or equal to the first distance threshold; the distance Far is greater than the first distance threshold; and the distance Unknow is greater than the second distance threshold. Certainly, the division of the distance herein may be set according to an actual requirement.

Figure 4:
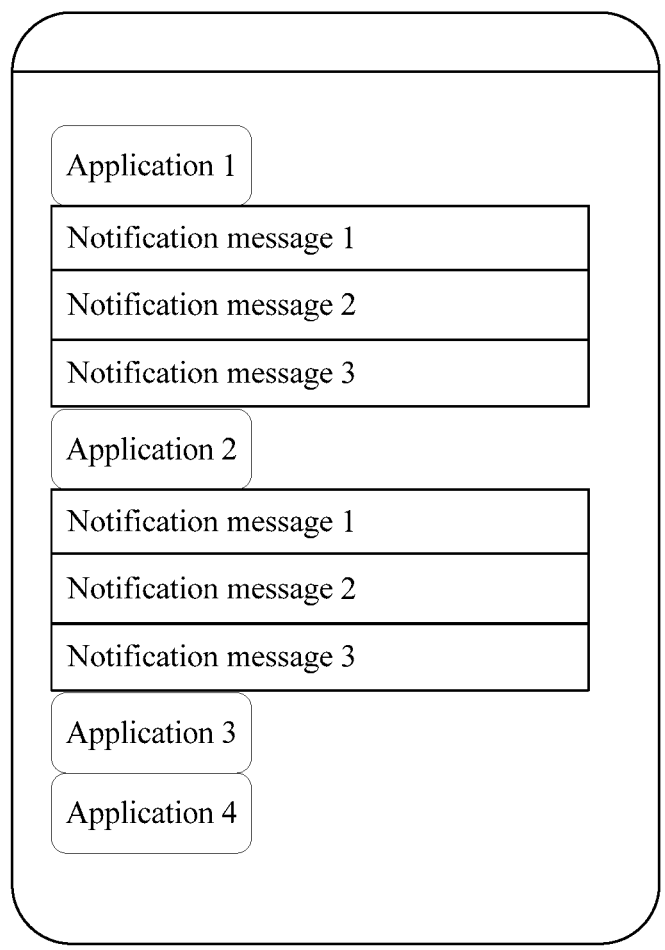
FIG. 4 is a schematic diagram of a terminal interface according to Embodiment 2 of the present invention.

(1) When the distance is Immediate and Near, both an application program icon and a notification message are output, for example, an application 1 and an application 2 in FIG. 4.

(2) When the distance is Far, an application program icon is output, but a notification message is not output, for example, an application 3 and an application 4 in FIG. 4. In this way, after a user goes far away from a store, the user can still enter an application program by directly tapping an icon to read store information.

(3) When the distance is Unknow, neither an application program icon nor a notification message is output. That is, when a communications unit of a mobile terminal cannot receive a broadcast message, both an application program icon and a corresponding notification message are deleted automatically. In this way, no massive notification message processing operations are brought to a user.

In addition, when the display manner of the first notification message is the same as that of the second notification message, display orders of the first notification message and the second notification message are arranged according to the first distance and the second distance, or display orders of the first notification message and the second notification message are arranged according to receiving time of the first notification message and the second notification message.

That is, the application 1 and the application 2 in FIG. 4 may be sorted according to receiving time of notification messages, sorting an earlier received notification message first, as shown in FIG. 4, or sorting in a reverse order, or may be sorted according to the first distance and the second distance. The same principle is also applied to the application 3 and the application 4 in FIG. 4, and details are not described herein. Certainly, sorting may be performed according to time for setting up a connection between the mobile terminal and a signal transmitter device.

Figure 5:
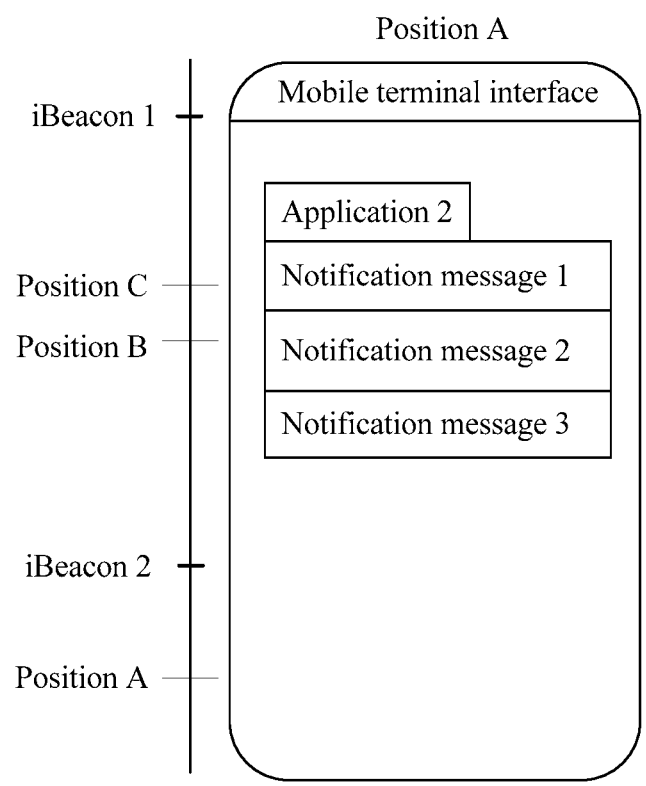
FIG. 5 is a schematic diagram of a terminal interface according to Embodiment 2 of the present invention.

The following further describes an interface display change of the mobile terminal when a user moves:

As shown in FIG. 5, when the mobile terminal is in a position A, if a distance between the mobile terminal and an iBeacon 2 is Near, the mobile terminal receives a notification message sent by a server 2 corresponding to the iBeacon 2, and presents both content and an icon of the notification message in an interface of the mobile terminal. If a distance between the mobile terminal and an iBeacon 1 is Unknow, the mobile terminal cannot receive a notification message sent by a server 1 corresponding to the iBeacon 1.

Figure 6:
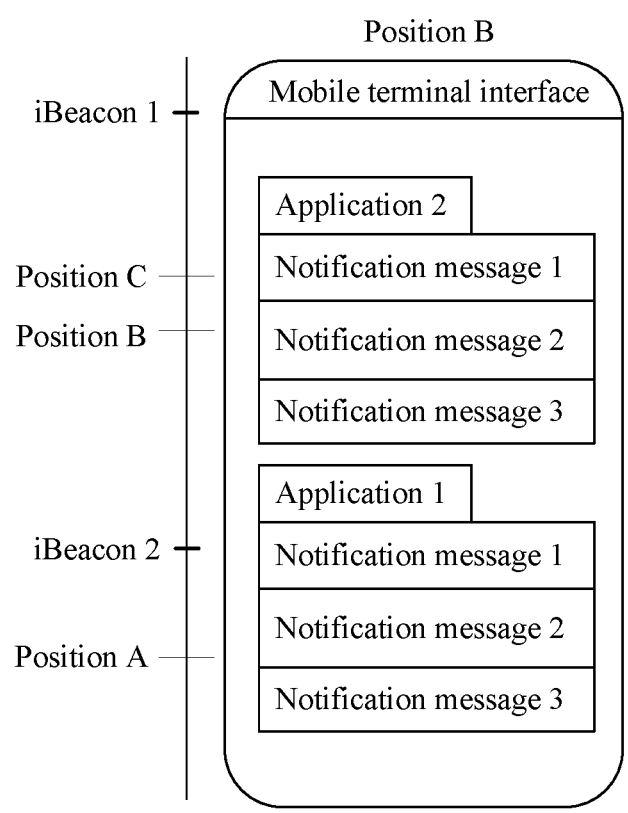
FIG. 6 is a schematic diagram of a terminal interface according to Embodiment 2 of the present invention.

As shown in FIG. 6, when the mobile terminal is in a position B, a distance between the mobile terminal and an iBeacon 1 is Near, and a distance between the mobile terminal and an iBeacon 2 is Near. When the distances between the mobile terminal and the iBeacons are the same, the mobile terminal receives both a notification message sent by a server 1 corresponding to the iBeacon 1 and a notification message sent by a server 2 corresponding to the iBeacon 2, and presents content and icons of the messages on a screen according to an order of receiving the notification messages. From a perspective of time, the mobile terminal first receives the notification message sent by the iBeacon 1, and sorting may be performed in a manner of sorting a later received notification message first.

Figure 7:
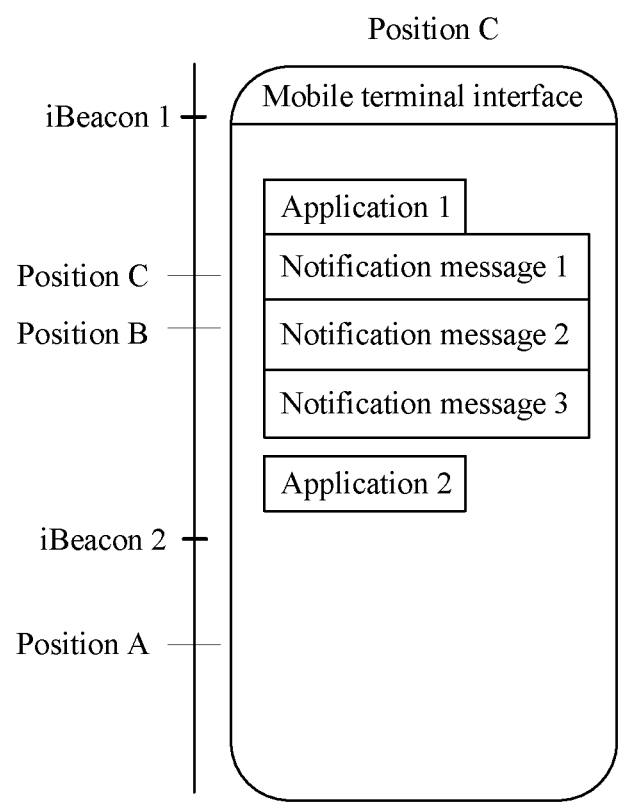
FIG. 7 is a schematic diagram of a terminal interface according to Embodiment 2 of the present invention.

As shown in FIG. 7, when the mobile terminal is in a position C, a distance between the mobile terminal and an iBeacon 1 is Near, and a distance between the mobile terminal and an iBeacon 2 is Far. The mobile terminal receives both a notification message sent by a server 1 corresponding to the iBeacon 1 and a notification message sent by a server 2 corresponding to the iBeacon 2, and presents content and icons of the messages on a screen according to the distances.

In another embodiment, when a distance is less than a second distance threshold, a same display manner is used, for example:

when the first distance between the mobile terminal and the first signal transmitter device is less than the second distance threshold, both an application program icon and a notification message are output.

When the first distance between the mobile terminal and the first signal transmitter device is greater than or equal to the second distance threshold, neither an application program icon nor a notification message is output.

Figure 8:
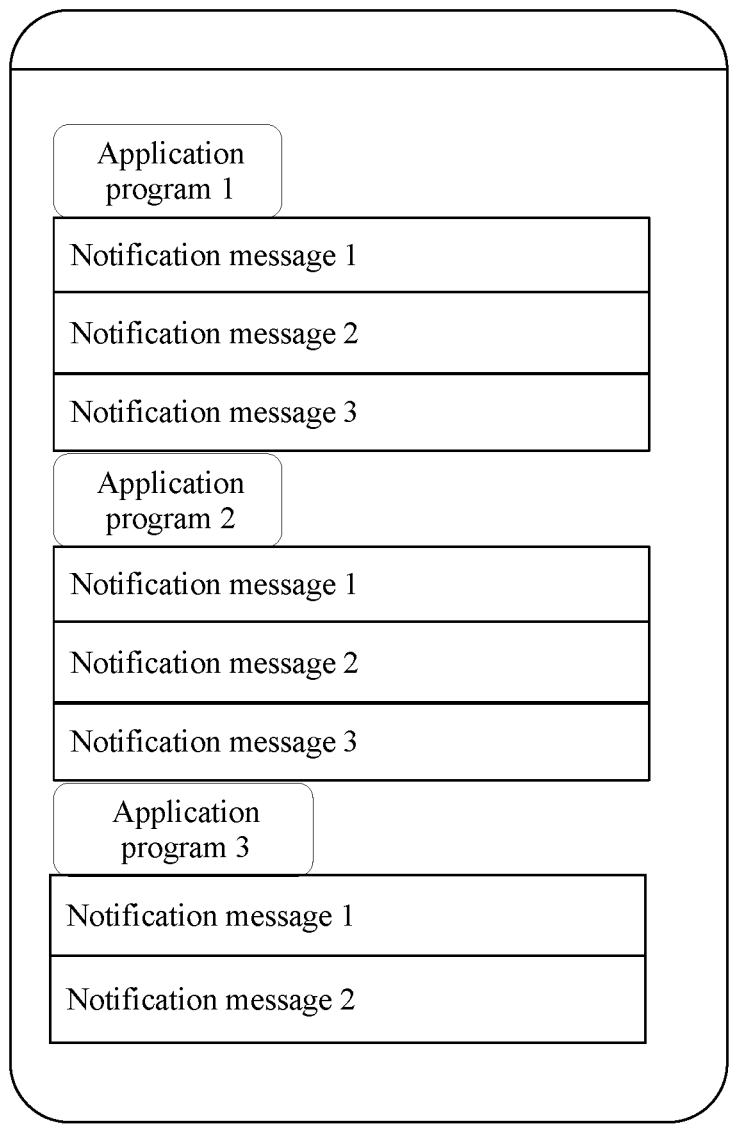
FIG. 8 is a schematic diagram of a terminal interface according to Embodiment 2 of the present invention.

A screen display result of the mobile terminal implemented in this manner is shown in FIG. 8.

In this embodiment of the present invention, a UUID, associated with at least one application program, of at least one signal transmitter device is stored; after a first broadcast message sent by a first signal transmitter device is received, request information is sent, according to a UUID of the first signal transmitter device in the broadcast message, to a first server corresponding to a first application program associated with the UUID of the first signal transmitter device, where the request information includes the UUID of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient. In addition, when the first notification message is displayed, specifically, a first distance between a mobile terminal and the first signal transmitter device is determined according to signal strength of a second broadcast message, and then a display manner is determined according to a magnitude relationship between the first distance and a first distance threshold, so that a notification message sent by a signal transmitter device at a short distance is emphatically displayed. Then, when display manners of two notification messages are the same, display orders of the two notification messages are arranged according to distances between the mobile terminal and signal transmitter devices sending the two notification messages, or display orders of the two notification messages are arranged according to receiving time of the two notification messages, so that a notification message sent by a store at a short distance is displayed with priority.

Embodiment 3

Figure 9:
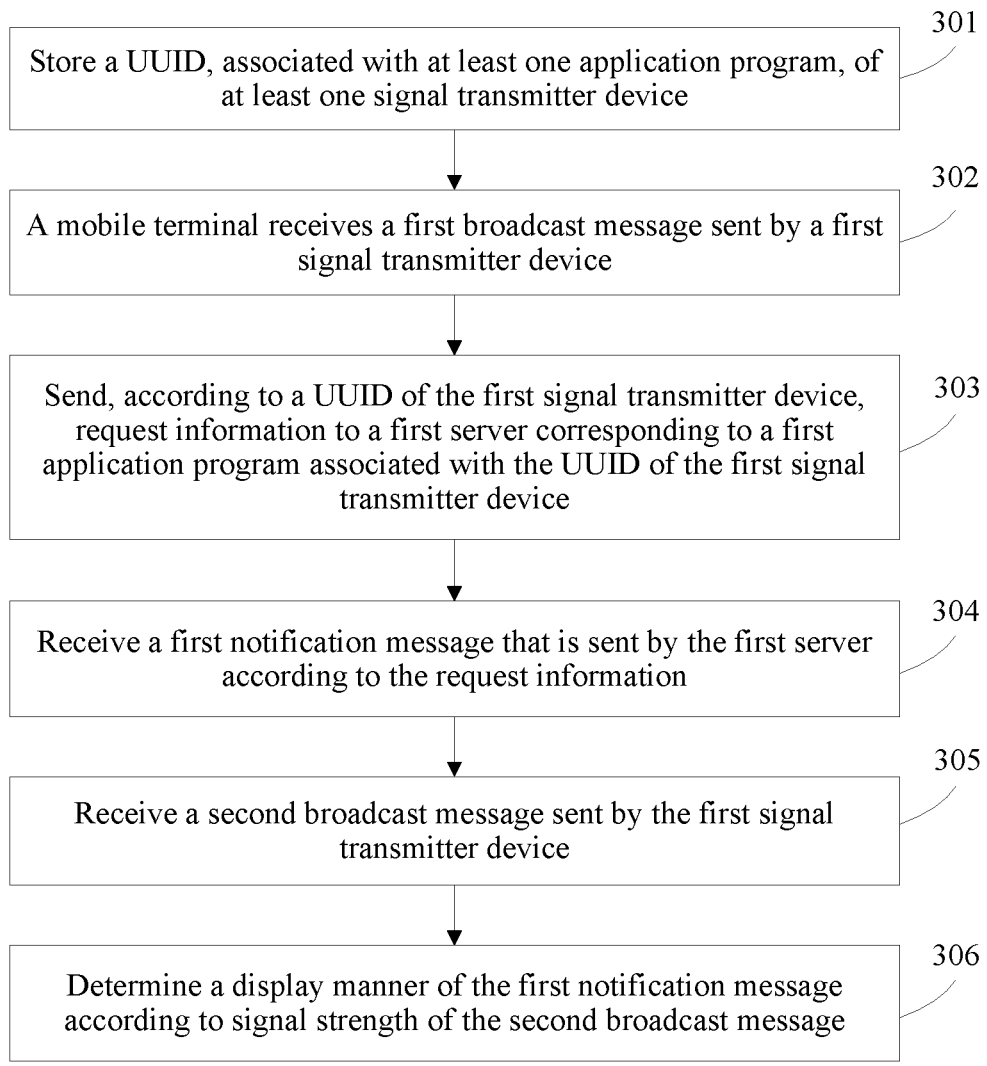
FIG. 9 is a flowchart of a message pushing method according to Embodiment 3 of the present invention.

This embodiment of the present invention provides a message pushing method, which is applied to a mobile terminal. A difference between this embodiment and Embodiment 2 lies in a condition for using a first display manner and a second display manner. Referring to FIG. 9, the method includes:

Step 301: The mobile terminal stores a UUID, associated with at least one application program, of at least one signal transmitter device.

Step 302: Receive a first broadcast message sent by a first signal transmitter device, where the first broadcast message includes signal strength and a UUID of the first signal transmitter device.

Step 303: Send, according to the UUID of the first signal transmitter device, request information to a first server corresponding to a first application program associated with the UUID of the first signal transmitter device, where the request information includes the UUID of the first signal transmitter device.

Step 304: Receive a first notification message that is sent by the first server according to the request information.

The foregoing steps 301 to 304 are the same as steps 201 to 204 in Embodiment 2, and details are not described herein.

Step 305: Receive a second broadcast message sent by the first signal transmitter device.

Step 306: Determine a display manner of the first notification message according to signal strength of the second broadcast message.

Specifically, step 306 may be implemented in the following manner:

determining a first distance between the mobile terminal and the first signal transmitter device according to the signal strength of the second broadcast message; and displaying the first notification message on a screen of the mobile terminal in a first manner when the first distance is less than or equal to a second distance threshold and the first distance is greater than a first distance corresponding to signal strength in a broadcast message received last time, or displaying the first notification message on a screen of the mobile terminal in a second manner when the first distance is less than or equal to a second distance threshold and the first distance is less than a first distance corresponding to signal strength in a broadcast message received last time.

Further, the method further includes:

not displaying the first notification message on the screen of the mobile terminal when the first distance between the mobile terminal and the first signal transmitter device is greater than the second distance threshold.

In this embodiment, the first manner may be outputting both an application program icon and a notification message; and the second manner may be outputting an application program icon, but not outputting a notification message.

The following further describes step 306 by using an example:

A distance between the first signal transmitter device and the mobile terminal is divided into Immediate, Near, Far, and Unknow. The distance Immediate and the distance Near are less than or equal to a first distance threshold; the distance Far is greater than the first distance threshold; and the distance Unknow is greater than the second distance threshold. Certainly, the division of the distance herein may be set according to an actual requirement.

(1) When the distance changes from Unknow to Far, or from Far to Immediate, or from Far to Near, both an application program icon and the first notification message are output, for example, an application 1 and an application 2 in FIG. 4.

(2) When the distance changes from Immediate or Near, or from Immediate to Far, an application program icon is output, but the first notification message is not output, for example, an application 3 and an application 4 in FIG. 4. In this way, after a user goes far away from a store, the user can still enter an application program by directly tapping an icon to read store information.

(3) When the distance changes from Far to Unknow, or from Immediate to Unknow, neither an application program icon nor the first notification message is output. That is, when a communications unit of the mobile terminal cannot receive a broadcast message, both an application program icon and a first notification message corresponding to the application program icon are deleted automatically. In this way, no massive notification message processing operations are brought to a user.

In this embodiment of the present invention, a UUID, associated with at least one application program, of at least one signal transmitter device is stored; after a first broadcast message sent by a first signal transmitter device is received, request information is sent, according to a UUID of the first signal transmitter device in the broadcast message, to a first server corresponding to a first application program associated with the UUID of the first signal transmitter device, where the request information includes the UUID of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient. In addition, when the first notification message is displayed, specifically, a first distance between a mobile terminal and the first signal transmitter device is determined according to signal strength of a second broadcast message, and then a display manner is determined according to a magnitude relationship between the first distance and a first distance determined last time, so that a notification message sent by a signal transmitter device at an increasingly shorter distance is emphatically displayed. Then, when display manners of two notification messages are the same, display orders of the two notification messages are arranged according to distances between the mobile terminal and signal transmitter devices sending the two notification messages, or display orders of the two notification messages are arranged according to receiving time of the two notification messages, so that a notification message sent by a store at a short distance is displayed with priority.

Embodiment 4

Figure 10:
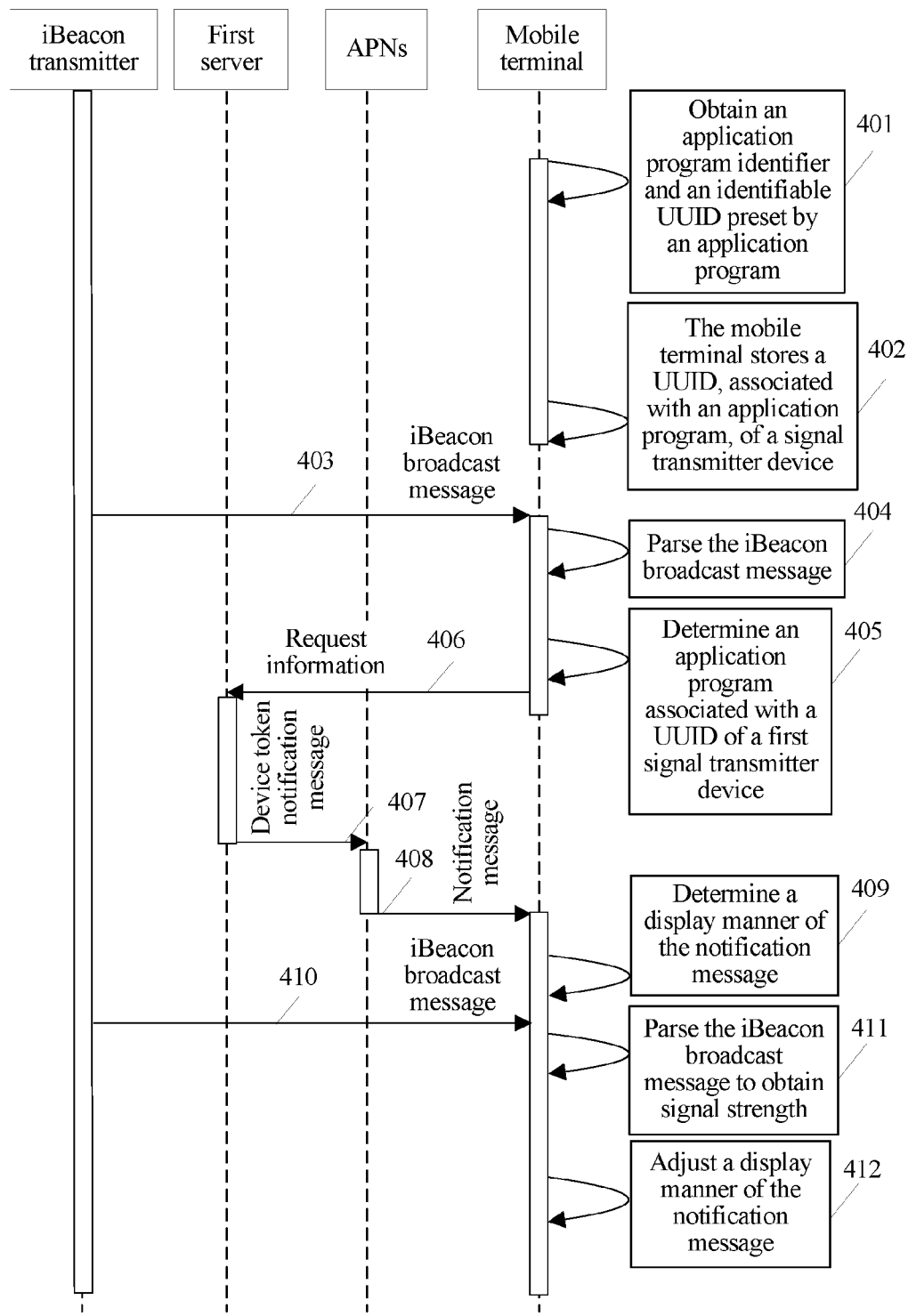
FIG. 10 is a flowchart of a message pushing method according to Embodiment 4 of the present invention.

This embodiment of the present invention provides a message pushing method. The method is implemented based on an APNs technology. Referring to FIG. 10, the method includes:

Step 401: During installation of an application program, a mobile terminal obtains an application program identifier and an identifiable UUID preset by the application program.

The mobile terminal is an iOS8 device, and may be specifically a device such as an iPhone or an iPad.

Step 402: The mobile terminal stores a UUID, associated with at least one application program, of at least one signal transmitter device.

In specific implementation, an association between an application program and a UUID of a signal transmitter device may be stored by using a database. The database may be stored locally or stored on a first server, so that the mobile terminal can perform a real-time query.

It is easy to know that one application program may be associated with a UUID of one or more signal transmitter devices, and the association may be stored in the database in a list manner, which is shown in the following table, but not limited to this form:

| Application program | UUID |
|---|---|
| Application program 1 | UUID 1 |
|  | ... |
|  | UUID n |
| Application program 2 | UUID' 1 |
|  | ... |
|  | UUID' n |
| Application program n | UUID" 1 |
|  | ... |
|  | UUID" n |

Step 403: The mobile terminal receives an iBeacon broadcast message sent by an iBeacon transmitter (a first signal transmitter device), where the iBeacon broadcast message includes a UUID of the iBeacon transmitter and signal strength.

The UUID is used to identify an enterprise or a store to which the iBeacon transmitter belongs, and the UUID is a 128-bit identifier. The signal strength is used to identify a distance between the iBeacon transmitter and the mobile terminal. The distance between the iBeacon transmitter and the mobile terminal may be determined according to the signal strength in the received broadcast message. In addition to the foregoing two fields, the broadcast message may further include a Major field and a Minor field. Major and Minor are 16-bit identifiers set by a publisher, and may be empty.

Step 404: The mobile terminal parses the iBeacon broadcast message to obtain the UUID and the signal strength.

Parsing the iBeacon broadcast message belongs to the prior art, and details are not described herein.

Step 405: The mobile terminal determines, according to a prestored association relationship between an application program and a UUID, an application program associated with the UUID of the first signal transmitter device.

The prestored mapping relationship between the application program identifier and the UUID is implemented in step 302.

Step 406: The mobile terminal directly sends request information to the application program associated with the UUID of the first signal transmitter device, so that the application program sends the request information to a first server corresponding to the application program, where the request information includes the UUID and the signal strength, and the request information is used to request a first notification message corresponding to the signal strength.

Step 407: The first server sends a device identifier (device token) and the first notification message that is determined according to the request information to an APNs.

When an application program (Application, "APP" for short) is installed on the iOS8 device, a prompt pops up, enabling a user to select whether to start a push service. When the user allows the push service by means of selection, the iOS device initiates a registration request to an APNs. After receiving the request from the device, the APNs uses particular information of a device certificate to generate a device token, where the device token includes information that can uniquely identify the device. The APNs synchronizes a relationship between the mobile terminal and the device token corresponding to the mobile terminal to the first server. When receiving a request message sent by the mobile terminal, the first server may send the device token corresponding to the mobile terminal to the APNs.

Step 408: The APNs searches for the mobile terminal corresponding to the device token, and sends the first notification message to the mobile terminal, where content of the first notification message includes discount information, an advertisement push, or a store position, and the content of the first notification message is determined by the first server according to the signal strength. The first notification message may be fully used to provide a correct guide for a customer.

Certainly, in this embodiment, the first notification message may further include other content, which is not limited in this application.

Specifically, when sending the first notification message, the first server may determine the content of the first notification message according to the signal strength. For example, when the signal strength shows that there is a long distance between the mobile terminal (a customer) and the iBeacon transmitter (a store), a first notification message including a store position may be sent to guide the customer towards the store; when the signal strength shows that there is a short distance between the mobile terminal (a customer) and the iBeacon transmitter (a store), a first notification message including discount information may be sent to guide the customer towards consumption.

Step 409: Determine a display manner of the first notification message according to the signal strength of the broadcast message.

Specifically, a first distance between the mobile terminal and the iBeacon transmitter is determined according to the signal strength of the broadcast message.

When the first distance between the mobile terminal and the iBeacon transmitter is less than or equal to a first distance threshold, the first notification message is displayed on a screen of the mobile terminal in a first manner.

When the first distance between the mobile terminal and the iBeacon transmitter is greater than a first distance threshold, the first notification message is displayed on a screen of the mobile terminal in a second manner. The first manner is different from the second manner.

A specific output manner may be the same as that in Embodiment 2 or Embodiment 3, and details are not described herein.

Step 410: The mobile terminal continues to receive an iBeacon broadcast message.

Step 411: The mobile terminal parses the iBeacon broadcast message to obtain signal strength.

Step 412s: Adjust a display manner of the first notification message according to the signal strength of the broadcast message.

Specifically, a first distance between the mobile terminal and the iBeacon transmitter is determined according to the signal strength of the broadcast message.

When the first distance is less than or equal to a second distance threshold and the first distance is greater than the first distance corresponding to the signal strength in the broadcast message received last time, the first notification message is displayed on the screen of the mobile terminal in the first manner.

When the first distance is less than or equal to a second distance threshold and the first distance is less than the first distance corresponding to the signal strength in the broadcast message received last time, the first notification message is displayed on the screen of the mobile terminal in the second manner.

A specific output manner may be the same as that in Embodiment 2 or Embodiment 3, and details are not described herein.

In steps 410 to 412, it is implemented that signal strength between the mobile terminal and the iBeacon transmitter is detected in real time, and displaying the first notification message on the screen of the mobile terminal is adjusted according to the signal strength.

In this embodiment of the present invention, a UUID, associated with at least one application program, of at least one signal transmitter device is stored; after a first broadcast message sent by a first signal transmitter device is received, request information is sent, according to a UUID of the first signal transmitter device in the broadcast message, to a first server corresponding to a first application program associated with the UUID of the first signal transmitter device, where the request information includes the UUID of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient. In addition, when the first notification message is displayed, specifically, a first distance between a mobile terminal and the first signal transmitter device is determined according to signal strength of a second broadcast message, and then a display manner is determined according to a magnitude relationship between the first distance and a first distance threshold, so that a notification message sent by a signal transmitter device at a short distance is emphatically displayed. Then, when display manners of two notification messages are the same, display orders of the two notification messages are arranged according to distances between the mobile terminal and signal transmitter devices sending the two notification messages, or display orders of the two notification messages are arranged according to receiving time of the two notification messages, so that a notification message sent by a store at a short distance is displayed with priority.

Embodiment 5

Figure 11:
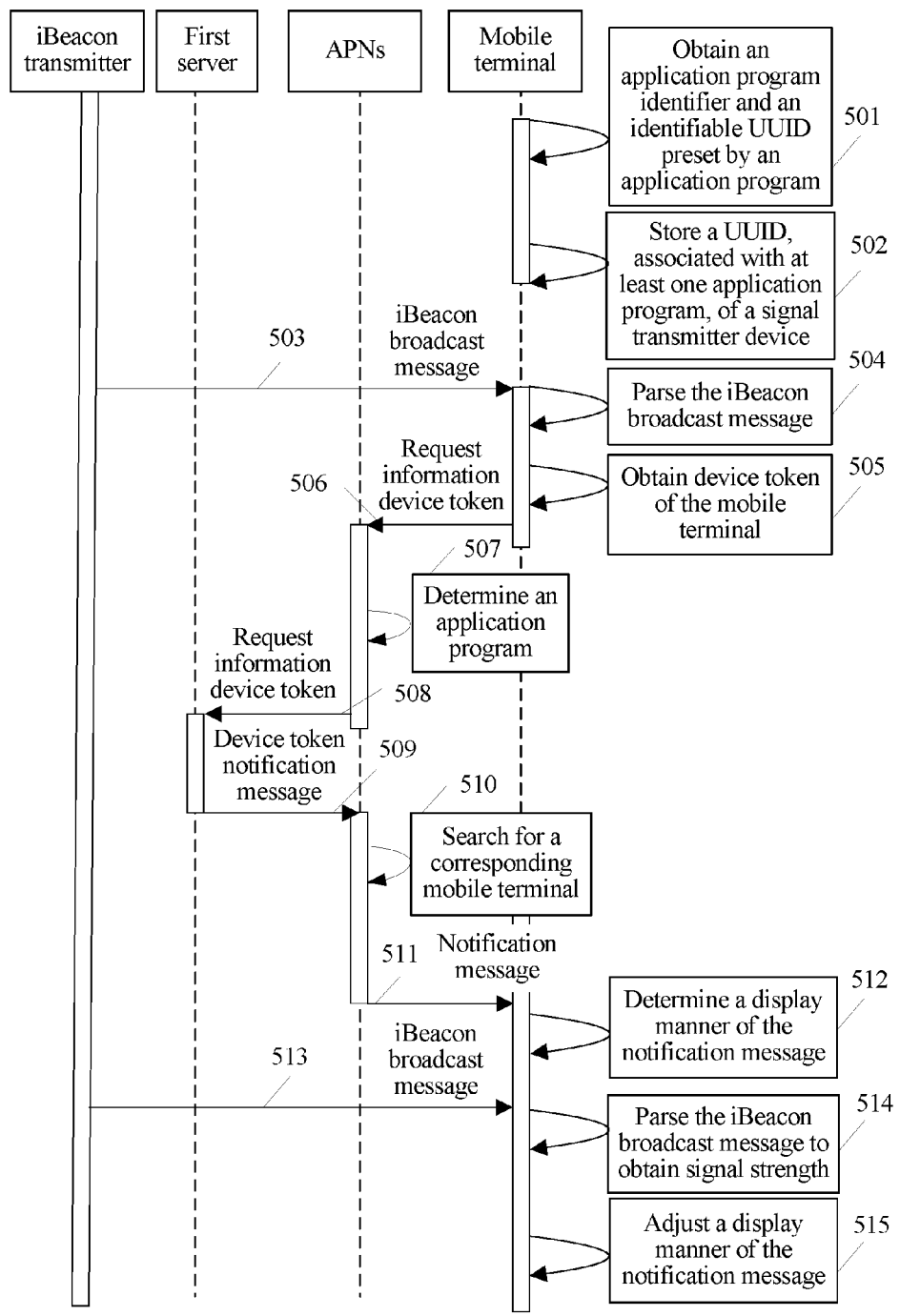
FIG. 11 is a flowchart of a message pushing method according to Embodiment 5 of the present invention.

This embodiment of the present invention provides a message pushing method. The method is implemented based on an APNs technology. A difference between this embodiment and Embodiment 4 lies in how to send request information to a first server. Referring to FIG. 11, the method includes:

Step 501: During installation of an application program, a mobile terminal obtains an application program identifier and an identifiable UUID preset by the application program.

Step 502: The mobile terminal stores a UUID, associated with at least one application program, of at least one signal transmitter device.

Step 503: The mobile terminal receives an iBeacon broadcast message sent by an iBeacon transmitter (a first signal transmitter device), where the iBeacon broadcast message includes a UUID of the iBeacon transmitter and signal strength.

Step 504: The mobile terminal parses the iBeacon broadcast message to obtain the UUID and the signal strength.

Steps 501 to 504 are the same as steps 401 to 404 in Embodiment 4, and details are not described herein.

Step 505: The mobile terminal obtains a device token of the mobile terminal.

When an APP is installed on an iOS8 device, a prompt pops up, enabling a user to select whether to start a push service. When the user allows the push service by means of selection, the iOS device initiates a registration request to an APNs. After receiving the request from the device, the APNs uses particular information of a device certificate to generate a device token, where the device token includes information that can uniquely identify the device.

Step 506: The mobile terminal sends request information and the device token to an APNs, where the request information includes the UUID and the signal strength, and the request information is used to request a first notification message corresponding to the signal strength.

Step 507: The APNs determines, according to an association relationship between an application program and a UUID, an application program associated with the UUID of the first signal transmitter device.

The application program identifier and the UUID may be set in advance, or may be obtained synchronously from the mobile terminal.

Step 508: The APNs sends the request information and the device token to a first server corresponding to the application program.

A difference between this embodiment and Embodiment 3 lies in that the request information is sent to the first server by using the application program in Embodiment 3, while the request information is sent to the first server by using the APNs in this application.

Step 509: The first server sends the device token and the first notification message that is determined according to the request information to the APNs, where content of the first notification message includes discount information, an advertisement push, or a store position, and the content of the first notification message is determined by the first server according to the signal strength. The first notification message may be fully used to provide a correct guide for a customer.

Certainly, in this embodiment, the first notification message may further include other content, which is not limited in this application.

Specifically, when sending the first notification message, the first server may determine the content of the first notification message according to the signal strength. For example, when the signal strength shows that there is a long distance between the mobile terminal (a customer) and the iBeacon transmitter (a store), a first notification message including a store position may be sent to guide the customer towards the store; when the signal strength shows that there is a short distance between the mobile terminal (a customer) and the iBeacon transmitter (a store), a first notification message including discount information may be sent to guide the customer towards consumption.

Step 510: The APNs searches for the mobile terminal corresponding to the device token.

Step 511: The APNs sends the first notification message to the mobile terminal.

Step 512: Determine a display manner of the first notification message according to the signal strength of the broadcast message.

Specifically, a first distance between the mobile terminal and the iBeacon transmitter is determined according to the signal strength of the broadcast message.

When the first distance between the mobile terminal and the iBeacon transmitter is less than or equal to a first distance threshold, the first notification message is displayed on a screen of the mobile terminal in a first manner.

When the first distance between the mobile terminal and the iBeacon transmitter is greater than a first distance threshold, the first notification message is displayed on a screen of the mobile terminal in a second manner. The first manner is different from the second manner.

A specific output manner may be the same as that in Embodiment 2 or Embodiment 3, and details are not described herein.

Step 513: The mobile terminal continues to receive an iBeacon broadcast message.

Step 514: The mobile terminal parses the iBeacon broadcast message to obtain signal strength.

Step 515: Adjust a display manner of the first notification message according to the signal strength of the broadcast message.

Specifically, a first distance between the mobile terminal and the iBeacon transmitter is determined according to the signal strength of the broadcast message.

When the first distance is less than or equal to a second distance threshold and the first distance is greater than the first distance corresponding to the signal strength in the broadcast message received last time, the first notification message is displayed on the screen of the mobile terminal in the first manner.

When the first distance is less than or equal to a second distance threshold and the first distance is less than the first distance corresponding to the signal strength in the broadcast message received last time, the first notification message is displayed on the screen of the mobile terminal in the second manner.

A specific output manner may be the same as that in Embodiment 2 or Embodiment 3, and details are not described herein.

In steps 513 to 515, it is implemented that signal strength between the mobile terminal and the iBeacon transmitter is detected in real time, and displaying the first notification message on the screen of the mobile terminal is adjusted according to the signal strength.

In this embodiment of the present invention, a UUID, associated with at least one application program, of at least one signal transmitter device is stored; after a first broadcast message sent by a first signal transmitter device is received, request information is sent, according to a UUID of the first signal transmitter device in the broadcast message, to a first server corresponding to a first application program associated with the UUID of the first signal transmitter device, where the request information includes the UUID of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient. In addition, when the first notification message is displayed, specifically, a first distance between a mobile terminal and the first signal transmitter device is determined according to signal strength of a second broadcast message, and then a display manner is determined according to a magnitude relationship between the first distance and a first distance determined last time, so that a notification message sent by a signal transmitter device at an increasingly shorter distance is emphatically displayed. Then, when display manners of two notification messages are the same, display orders of the two notification messages are arranged according to distances between the mobile terminal and signal transmitter devices sending the two notification messages, or display orders of the two notification messages are arranged according to receiving time of the two notification messages, so that a notification message sent by a store at a short distance is displayed with priority.

Embodiment 6

Figure 12:
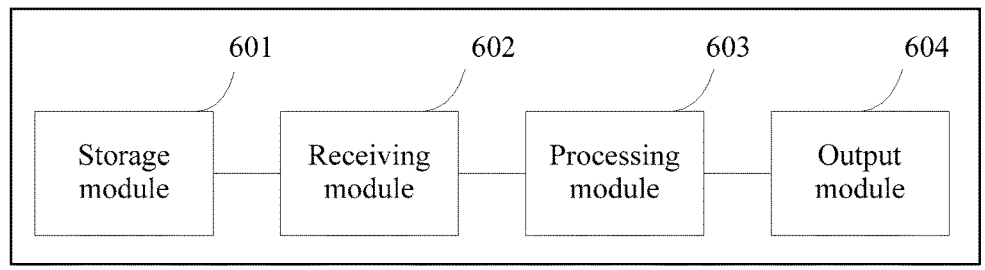
FIG. 12 is a block diagram of a message pushing apparatus according to Embodiment 6 of the present invention.

This embodiment of the present invention provides a message pushing apparatus. The apparatus may be a mobile terminal. Referring to FIG. 12, the apparatus includes:

a storage module 601, configured to store a UUID, associated with at least one application program, of at least one signal transmitter device;

a receiving module 602, configured to receive a first broadcast message sent by a first signal transmitter device, where the first broadcast message includes a UUID of the first signal transmitter device;

a processing module 603, configured to send, according to the UUID of the first signal transmitter device, request information to a first server corresponding to a first application program associated with the UUID of the first signal transmitter device, where the request information includes the UUID of the first signal transmitter device; and an output module 604, configured to receive and display a first notification message that is sent by the first server according to the request information.

The signal transmitter device may be an iBeacon transmitter, a GPS signal transmitter device, a Wi-Fi signal transmitter device, a base station, or the like.

In specific implementation, an association between an application program and a UUID of a signal transmitter device may be stored by using a database. The database may be stored locally or stored on a first server, so that the mobile terminal can perform a real-time query.

It is easy to know that one application program may be associated with a UUID of one or more signal transmitter devices, and the association may be stored in the database in a list manner, which is shown in the following table, but not limited to this form:

| Application program | UUID |
|---|---|
| Application program 1 | UUID 1 |
|  | ... |
|  | UUID n |
| Application program 2 | UUID' 1 |
|  | ... |
|  | UUID' n |
| Application program n | UUID" 1 |
|  | ... |
|  | UUID" n |

The UUID is used to identify an enterprise or a store to which the first signal transmitter device belongs, and the UUID is a 128-bit identifier. The first broadcast message may further include other fields, for example, a signal strength field, a Major (major) field, and a Minor (minor) field. Signal strength is used to identify a distance between the first signal transmitter device and the mobile terminal. The distance between the first signal transmitter device and the mobile terminal may be determined according to the signal strength in the received first broadcast message. Major and Minor are 16-bit identifiers set by a publisher, and may be empty.

After receiving broadcast information, the mobile terminal parses the first broadcast message to obtain the UUID and the signal strength. Parsing the first broadcast message belongs to the prior art, and details are not described herein.

The UUID carried in the request information may enable the first server to send to the first signal transmitter device corresponding to the UUID.

Content of the first notification message includes discount information, an advertisement push, or a store position. Certainly, in this embodiment, the first notification message may further include other content, which is not limited in this application.

Specifically, when the first server is used to send the first notification message, the content of the first notification message may be determined according to the signal strength. For example, when the signal strength shows that there is a long distance between the mobile terminal (a customer) and a first device (a store), a first notification message including a store position may be sent to guide the customer towards the store; when the signal strength shows that there is a short distance between the mobile terminal (a customer) and a first device (a store), a first notification message including discount information may be sent to guide the customer towards consumption.

In this embodiment, when the mobile terminal is in a lock screen state, the first notification message is directly displayed in a lock screen interface.

In this embodiment of the present invention, a UUID, associated with at least one application program, of at least one signal transmitter device is stored; after a first broadcast message sent by a first signal transmitter device is received, request information is sent, according to a UUID of the first signal transmitter device in the broadcast message, to a first server corresponding to a first application program associated with the UUID of the first signal transmitter device, where the request information includes the UUID of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient.

Embodiment 7

Figure 13:
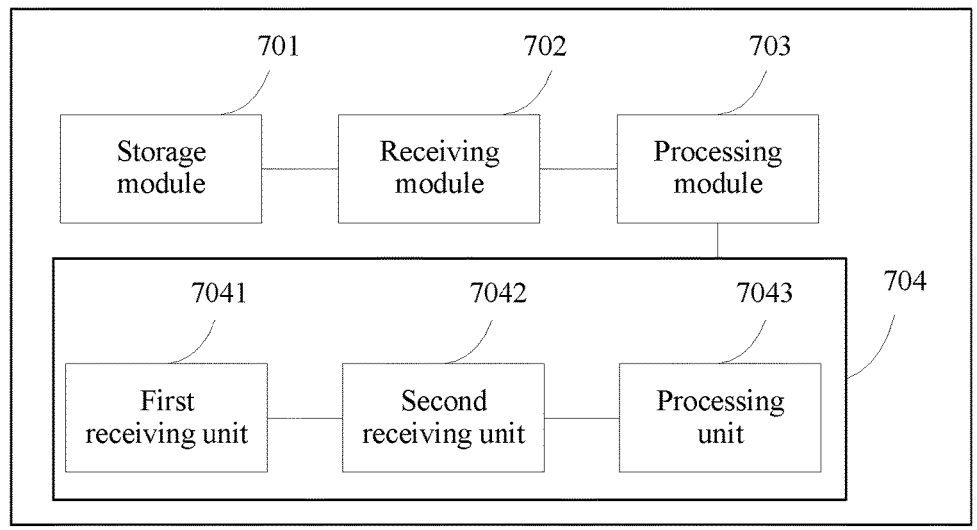
FIG. 13 is a block diagram of a message pushing apparatus according to Embodiment 7 of the present invention.

This embodiment of the present invention provides a message pushing apparatus. The apparatus may be a mobile terminal. Referring to FIG. 13, the apparatus includes:

a storage module 701, configured to store a UUID, associated with at least one application program, of at least one signal transmitter device;

a receiving module 702, configured to receive a first broadcast message sent by a first signal transmitter device, where the first broadcast message includes a UUID of the first signal transmitter device;

a processing module 703, configured to send, according to the UUID of the first signal transmitter device, request information to a first server corresponding to a first application program associated with the UUID of the first signal transmitter device, where the request information includes the UUID of the first signal transmitter device; and an output module 704, configured to receive and display a first notification message that is sent by the first server according to the request information.

The signal transmitter device may be an iBeacon transmitter, a GPS signal transmitter device, a Wi-Fi signal transmitter device, a base station, or the like.

In specific implementation, an association between an application program and a UUID of a signal transmitter device may be stored by using a database. The database may be stored locally or stored on a first server, so that the mobile terminal can perform a real-time query.

It is easy to know that one application program may be associated with a UUID of one or more signal transmitter devices, and the association may be stored in the database in a list manner, which is shown in the following table, but not limited to this form:

| Application program | UUID |
|---|---|
| Application program 1 | UUID 1 |
| | ... |
| | UUID n |
| Application program 2 | UUID' 1 |
| | ... |
| | UUID' n |
| Application program n | UUID'' 1 |
| | ... |
| | UUID'' n |

The UUID is used to identify an enterprise or a store to which the first signal transmitter device belongs, and the UUID is a 128-bit identifier. The first broadcast message may further include other fields, for example, a signal strength field, a Major (major) field, and a Minor (minor) field. Signal strength is used to identify a distance between the first signal transmitter device and the mobile terminal. The distance between the first signal transmitter device and the mobile terminal may be determined according to the signal strength in the received first broadcast message. Major and Minor are 16-bit identifiers set by a publisher, and may be empty.

After receiving broadcast information, the mobile terminal parses the first broadcast message to obtain the UUID and the signal strength. Parsing the first broadcast message belongs to the prior art, and details are not described herein.

The UUID carried in the request information may enable the first server to send to the first signal transmitter device corresponding to the UUID.

In this embodiment, content of the first notification message is determined by the first server according to the signal strength. The first notification message may be fully used to provide a correct guide for a customer. The content of the first notification message includes discount information, an advertisement push, or a store position. Certainly, in this embodiment, the first notification message may further include other content, which is not limited in this application.

Specifically, when the first server is used to send the first notification message, the content of the first notification message may be determined according to the signal strength. For example, when the signal strength shows that there is a long distance between the mobile terminal (a customer) and a first device (a store), a first notification message including a store position may be sent to guide the customer towards the store; when the signal strength shows that there is a short distance between the mobile terminal (a customer) and a first device (a store), a first notification message including discount information may be sent to guide the customer towards consumption.

In this embodiment, when the mobile terminal is in a lock screen state, the first notification message is directly displayed in a lock screen interface.

In this embodiment, the output module 704 includes:

a first receiving unit 7041, configured to receive the first notification message that is sent by the first server according to the request information;

a second receiving unit 7042, configured to receive a second broadcast message sent by the first signal transmitter device; and a processing unit 7043, configured to determine a display manner of the first notification message according to signal strength of the second broadcast message.

In this embodiment, the processing unit 7043 includes:

a determining subunit, configured to determine a first distance between the mobile terminal and the first signal transmitter device according to the signal strength of the second broadcast message; and a processing subunit, configured to: display the first notification message on a screen of the mobile terminal in a first manner when the first distance between the mobile terminal and the first signal transmitter device is less than or equal to a first distance threshold, or display the first notification message on a screen of the mobile terminal in a second manner when the distance between the mobile terminal and the first signal transmitter device is greater than a first distance threshold, where the first manner is different from the second manner.

Further, the receiving module 702 is further configured to receive a third broadcast message sent by a second signal transmitter device, where the third broadcast message includes the UUID of the first signal transmitter device.

The processing module 703 is further configured to send, according to a UUID of the second signal transmitter device, request information to a second server corresponding to a second application program associated with the UUID of the second signal transmitter device, where the request information includes the UUID of the second signal transmitter device.

The first receiving unit 7041 is further configured to receive a second notification message sent by the second server.

The second receiving unit 7042 is further configured to receive a fourth broadcast message sent by the second signal transmitter device.

The determining subunit is further configured to determine a second distance between the mobile terminal and the second signal transmitter device according to signal strength of the fourth broadcast message.

The processing subunit is further configured to: determine a display manner of the second notification message according to the second distance between the mobile terminal and the second signal transmitter device, and when the display manner of the first notification message is the same as that of the second notification message, arrange display orders of the first notification message and the second notification message according to the first distance and the second distance, or arrange display orders of the first notification message and the second notification message according to receiving time of the first notification message and the second notification message.

Specifically, sorting according to the receiving time of the first notification message and the second notification message may be sorting the earlier received first notification message first, or sorting in a reverse order. Certainly, in addition to the sorting according to the receiving time of the first notification message, sorting may further be performed according to time for setting up a connection between the mobile terminal and a signal transmitter device. Sorting according to the first distance and the second distance may be preferably sorting a longer distance first, or sorting in a reverse order.

In this embodiment, the first manner may be outputting both an application program icon and a notification message;

and the second manner may be outputting an application program icon, but not outputting a notification message.

Specifically, the outputting an application program icon and a notification message refers to displaying the application program icon and the notification message in the lock screen interface of the mobile terminal, so that in the lock screen state, a user can directly tap the application program icon and the notification message for reading.

Output on the mobile terminal also includes two cases: In a first case, the application program icon and the notification message are not displayed on the screen of the mobile terminal currently; and in a second case, the application program icon and the notification message are already displayed on the screen of the mobile terminal currently. For the first case, both the application program icon and the notification message can be directly displayed on the screen of the mobile terminal. For the second case, if it is determined that both an application program icon and a notification message are output, a new notification message is added on the screen; if it is determined that an application program icon is output, but a notification message is not output, the notification message on the screen is deleted.

Further, when it is determined that an application program icon is output, but a notification message is not output, the mobile terminal may further be controlled not to receive a notification message sent by an application program server corresponding to the application program.

In one implementation manner of this embodiment, the processing module 703 includes:

a first sending unit, configured to directly send the request information to the first application program associated with the UUID of the first signal transmitter device, so that the first application program sends the request information to the first server corresponding to the first application program.

In another implementation manner of this embodiment, the processing module 703 includes:

a search unit, configured to obtain a device identifier of the mobile terminal; and a second sending unit, configured to send the request information and the device identifier to a push notification server, so that the push notification server sends the request information and the device identifier to the first server.

The following further describes a working process of the output module 704 by using an example:

A distance between the first signal transmitter device and the mobile terminal is divided into Immediate, Near, Far, and Unknow. The distance Immediate and the distance Near are less than or equal to the first distance threshold; the distance Far is greater than the first distance threshold; and the distance Unknow is greater than a second distance threshold. Certainly, the division of the distance herein may be set according to an actual requirement.

(1) When the distance is Immediate and Near, both an application program icon and a notification message are output, for example, an application 1 and an application 2 in FIG. 4.

(2) When the distance is Far, an application program icon is output, but a notification message is not output, for example, an application 3 and an application 4 in FIG. 4. In this way, after a user goes far away from a store, the user can still enter an application program by directly tapping an icon to read store information.

(3) When the distance is Unknow, neither an application program icon nor a notification message is output. That is, when a communications unit of the mobile terminal cannot receive a broadcast message, both an application program icon and a corresponding notification message are deleted automatically. In this way, no massive notification message processing operations are brought to a user.

In addition, when the display manner of the first notification message is the same as that of the second notification message, display orders of the first notification message and the second notification message are arranged according to the first distance and the second distance, or display orders of the first notification message and the second notification message are arranged according to receiving time of the first notification message and the second notification message.

That is, the application 1 and the application 2 in FIG. 4 may be sorted according to receiving time of notification messages, sorting an earlier received notification message first, as shown in FIG. 4, or sorting in a reverse order, or may be sorted according to the first distance and the second distance. The same principle is also applied to the application 3 and the application 4 in FIG. 4, and details are not described herein. Certainly, sorting may be performed according to time for setting up a connection between the mobile terminal and a signal transmitter device.

The following further describes an interface display change of the mobile terminal when a user moves:

As shown in FIG. 5, when the mobile terminal is in a position A, if a distance between the mobile terminal and an iBeacon 2 is Near, the mobile terminal receives a notification message sent by a server 2 corresponding to the iBeacon 2, and presents both content and an icon of the notification message in an interface of the mobile terminal. If a distance between the mobile terminal and an iBeacon 1 is Unknow, the mobile terminal cannot receive a notification message sent by a server 1 corresponding to the iBeacon 1.

As shown in FIG. 6, when the mobile terminal is in a position B, a distance between the mobile terminal and an iBeacon 1 is Near, and a distance between the mobile terminal and an iBeacon 2 is Near. When the distances between the mobile terminal and the iBeacons are the same, the mobile terminal receives both a notification message sent by a server 1 corresponding to the iBeacon 1 and a notification message sent by a server 2 corresponding to the iBeacon 2, and presents content and icons of the messages on a screen according to an order of receiving the notification messages. From a perspective of time, the mobile terminal first receives the notification message sent by the iBeacon 1, and sorting may be performed in a manner of sorting a later received notification message first.

As shown in FIG. 7, when the mobile terminal is in a position C, a distance between the mobile terminal and an iBeacon 1 is Near, and a distance between the mobile terminal and an iBeacon 2 is Far. The mobile terminal receives both a notification message sent by a server 1 corresponding to the iBeacon 1 and a notification message sent by a server 2 corresponding to the iBeacon 2, and presents content and icons of the messages on a screen according to the distances.

In another embodiment, when a distance is less than a second distance threshold, a same display manner is used, for example:

when the first distance between the mobile terminal and the first signal transmitter device is less than the second distance threshold, both an application program icon and a notification message are output.

When the first distance between the mobile terminal and the first signal transmitter device is greater than or equal to the second distance threshold, neither an application program icon nor a notification message is output.

A screen display result of the mobile terminal implemented in this manner is shown in FIG. 8.

In another implementation manner of the present invention, the processing unit 7043 may further be configured to: display the first notification message on a screen of the mobile terminal in a first manner when the first distance is less than or equal to a second distance threshold and the first distance is greater than a first distance corresponding to signal strength in a broadcast message received last time, or display the first notification message on a screen of the mobile terminal in a second manner when the first distance is less than or equal to a second distance threshold and the first distance is less than a first distance corresponding to signal strength in a broadcast message received last time.

For example: (1) When the distance changes from Unknow to Far, or from Far to Immediate, or from Far to Near, both an application program icon and the first notification message are output, for example, an application 1 and an application 2 in FIG. 4.

(2) When the distance changes from Immediate or Near, or from Immediate to Far, an application program icon is output, but the first notification message is not output, for example, an application 3 and an application 4 in FIG. 4. In this way, after a user goes far away from a store, the user can still enter an application program by directly tapping an icon to read store information.

(3) When the distance changes from Far to Unknow, or from Immediate to Unknow, neither an application program icon nor the first notification message is output. That is, when a communications unit of the mobile terminal cannot receive a broadcast message, both an application program icon and a first notification message corresponding to the application program icon are deleted automatically. In this way, no massive notification message processing operations are brought to a user.

In this embodiment of the present invention, a UUID, associated with at least one application program, of at least one signal transmitter device is stored; after a first broadcast message sent by a first signal transmitter device is received, request information is sent, according to a UUID of the first signal transmitter device in the broadcast message, to a first server corresponding to a first application program associated with the UUID of the first signal transmitter device, where the request information includes the UUID of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient. In addition, when the first notification message is displayed, specifically, a first distance between a mobile terminal and the first signal transmitter device is determined according to signal strength of a second broadcast message, and then a display manner is determined according to a magnitude relationship between the first distance and a first distance threshold, so that a notification message sent by a signal transmitter device at a short distance is emphatically displayed. Then, when display manners of two notification messages are the same, display orders of the two notification messages are arranged according to distances between the mobile terminal and signal transmitter devices sending the two notification messages, or display orders of the two notification messages are arranged according to receiving time of the two notification messages, so that a notification message sent by a store at a short distance is displayed with priority.

Embodiment 8

Figure 14:
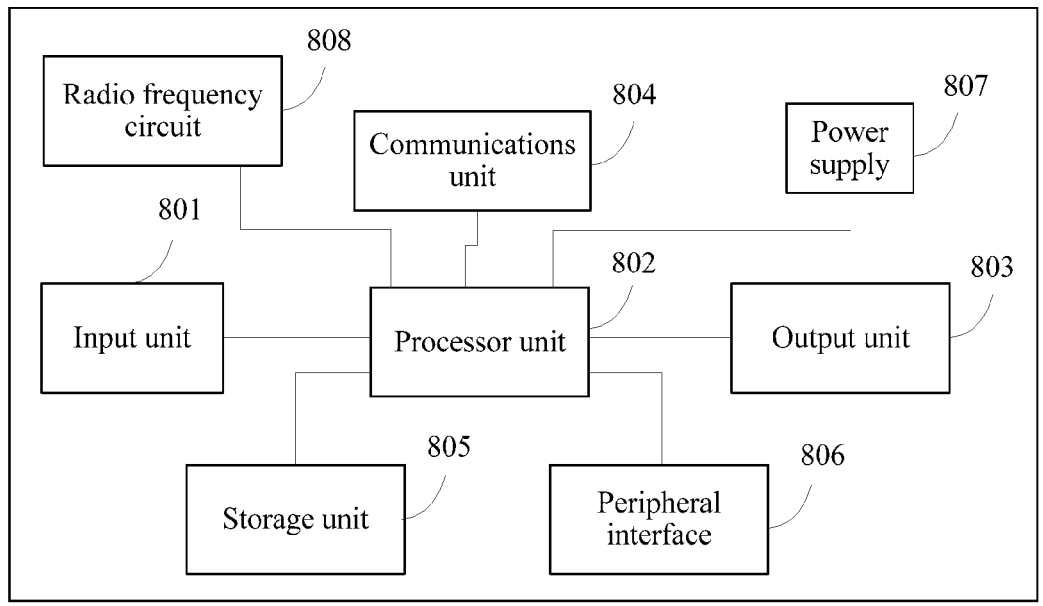
FIG. 14 is a block diagram of a message pushing apparatus according to Embodiment 8 of the present invention.

This embodiment of the present invention provides a message pushing apparatus. FIG. 14 is a block diagram of a message pushing apparatus 800 shown according to an exemplary embodiment. Referring to FIG. 14, the apparatus 800 may include one or more of the following components: an input unit 801, a processor unit 802, an output unit 803, a communications unit 804, a storage unit 805, a peripheral interface 806, a power supply 807, a radio frequency circuit 808, or the like. These components communicate with each other by using one or more buses. A person skilled in the art may understand that a structure of the mobile terminal shown in this figure does not constitute any limitation to the present invention, and instead the mobile terminal may be a bus structure, or a star structure, and may further include parts fewer or more than those shown in this figure, or a combination of some parts, or parts disposed differently. In an implementation manner of the present invention, the apparatus 800 may be any portable mobile terminal, including but not limited to a mobile phone, a mobile computer, a tablet computer, a personal digital assistant (Personal Digital Assistant, PDA), a media player, a smart television, a smart watch, smart glasses, a smart band, or the like.

The input unit 801 is configured to implement interaction between a user and the mobile terminal, and/or input information into the mobile terminal. For example, the input unit 801 may receive digit or character information that is input by a user, to generate signal input related to user configuration or function control. In a specific implementation manner of the present invention, the input unit 801 may be a touch panel, or may be another human-machine interaction interface, for example, a substantive input key or a microphone, or may be another external-information capture apparatus, for example, a camera. The touch panel is also referred to as a touchscreen or touchscreen, and may collect a touch or proximity operation of a user on the touch panel. For example, a user uses any appropriate object or accessory, such as, a finger or a stylus, to perform an operation on the touch panel or in a position of proximity to the touch panel and drive a corresponding connection apparatus according to a preset program. Optionally, the touch panel may include two parts: a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into contact coordinates, and then sends to the processing unit. The touch controller may further receive and execute a command sent by the processing unit. In addition, the touch panel may be implemented in multiple types such as a resistive type, a capacitive type, an infrared (Infrared) type, and a surface acoustic wave type. In another implementation manner of the present invention, the substantive input key used by the input unit 801 may include but is not limited to one or more of a physical keyboard, a function key (for example, a volume control button or a power on/off button), a trackball, a mouse, a joystick, or the like. The input unit 801 in a microphone form may collect a voice that is input by a user or an environment and convert the voice into a command that is in an electrical signal form and can be executed by the processing unit.

The processor unit 802 is a control center of the mobile terminal, connects to all parts of the entire mobile terminal by using various interfaces and lines, and executes various functions of the mobile terminal and/or processes data by running or executing a software program and/or a module stored in the storage unit 805 and by invoking data stored in the storage unit 805. The processor unit 802 may include an integrated circuit (Integrated Circuit, IC for short), for example, may include a singly-encapsulated IC or may include multiple connected encapsulated ICs with a same function or different functions. For example, the processor unit 802 may include only a central processing unit (Central Processing Unit, CPU for short), or may be a combination of a CPU, a digital signal processor (digital signal processor, DSP for short), a graphic processing unit (Graphic Processing Unit, GPU for short), and a control chip (for example, a baseband chip) in the communications unit 804. In an implementation manner of the present invention, the CPU may be a single operating core, or may include multiple operating cores.

The communications unit 804 is configured to set up a communication channel, so that the mobile terminal is connected to a communication peer end by using the communication channel and exchanges data with the communication peer end by using the communication channel. The communications unit 804 may include a wireless communications module such as a wireless local area network (Wireless Local Area Network, wireless LAN for short) module, a Bluetooth module, a near field communication (Near Field Communication, NFC for short) module, or a baseband (Base Band) module, and a wired communications module such as the Ethernet, a Universal Serial Bus (Universal Serial Bus, USB for short), or a lightning interface (Lightning, currently used by Apple Inc. in a device such as an iPhone5/5s/5c). The communications module is configured to perform communication between each component in the mobile terminal and the communication peer end, and may support direct memory access (Direct Memory Access).

In different implementation manners of the present invention, various communications modules in the communications unit 804 generally appear in a form of an integrated circuit chip (Integrated Circuit Chip), and may be combined selectively without including all communications modules. For example, the communications unit 804 may include only a baseband chip, a radio frequency chip, and a corresponding antenna, to provide a communication function in a cellular communications system. The mobile terminal may be connected to a cellular network (Cellular Network) or the Internet (Internet) through a wireless communications connection, for example, wireless local area network access or WCDMA access, set up by the communications unit 804. In some optional implementation manners of the present invention, the communications module in the communications unit 804, for example, the baseband module, may be integrated into the processor unit 802, typically for example, an APQ+MDM series platform provided by Qualcomm (Qualcomm) Inc.

The radio frequency circuit 808 is configured to receive and send information or receive and send a signal during a call. For example, after receiving downlink information from a base station, the radio frequency circuit 808 sends the downlink information to the processing unit for processing. In addition, the radio frequency circuit 808 sends designed uplink data to a base station. Generally, the radio frequency circuit 808 includes a well-known circuit configured to perform these functions, which includes but is not limited to an antenna system, a radio frequency transceiver, one or more amplifiers, a tuner, one or more oscillators, a digital signal processor, a codec (Codec) chipset, a subscriber identity module (SIM) card, a memory, or the like. In addition, the radio frequency circuit 808 may further communicate with a network and another device by means of wireless communications. The wireless communications may use any communications standard or protocol, including but not limited to GSM (Global System of Mobile communication, Global System for Mobile communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), a High Speed Uplink Packet Access (High Speed Uplink Packet Access, HSUPA) technology, LTE (Long Term Evolution, Long Term Evolution), Long Term Evolution Advanced (LTE-Advanced), or the like.

The output unit 803 may include but is not limited to an image output unit, an audio output unit, and a tactile output unit. The image output unit is configured to output a text, a picture, and/or video. The image output unit may include a display panel, for example, a display panel configured in a form of an LCD (Liquid Crystal Display, liquid crystal display), an OLED (Organic Light-Emitting Diode, organic light-emitting diode), a field emission display (field emission display, FED for short), or the like. Alternatively, the image output unit may include a reflective display, for example, an electrophoretic (electrophoretic) display, or a display using an interferometric modulation of light (Interferometric Modulation of Light) technology. The image output unit may include a single display or multiple displays in different sizes. In a specific implementation manner of the present invention, the touch panel used by the input unit 801 may also be used as a display panel of the output unit 803. For example, after detecting a touch or proximity gesture operation on the touch panel, the touch panel transmits the gesture operation to the processing unit to determine a touch event type, and then the processing unit provides corresponding visual output on the display panel according to the touch event type. In FIG. 14, the input unit 801 and the output unit 803 are used as two independent parts to implement input and output functions of the mobile terminal; however, in some embodiments, the touch panel and the display panel may be integrated to implement input and output functions of the mobile terminal. For example, the image output unit may display various graphical user interfaces (Graphical User Interface, GUI for short) as virtual control components, including but not limited to a window, a scroll bar, an icon, and a clipboard, so that a user performs an operation in a touch manner.

In a specific implementation manner of the present invention, the image output unit includes a filter and an amplifier, configured to filter and amplify video that is output by the processing unit. The audio output unit includes a digital-to-analog converter, configured to convert an audio signal, output by the processing unit, from a digital format to an analog format.

The storage unit 805 may be configured to store the software program and the module. By running the software program and the module that are stored in the storage unit 805, the processing unit executes various functional applications of the mobile terminal and implements data processing. The storage unit 805 mainly includes a program storage area and a data storage area, where the program storage area may be used to store an operating system, an application program required by at least one function, for example, an audio playback program or an image playback program; and the data storage area may be used to store data (for example, audio data and a phone book) created according to use of the mobile terminal, and the like. In a specific implementation manner of the present invention, the storage unit 805 may include a volatile memory, for example, a dynamic nonvolatile random access memory (Nonvolatile Random Access Memory, NVRAM for short), a phase change random access memory (Phase Change RAM, PRAM for short), or a magnetoresistive random access memory (Magetoresistive RAM, MRAM for short), or may include a nonvolatile memory, for example, at least one magnetic disk storage component, an electrically erasable programmable readonly memory (Electrically Erasable Programmable Read-Only Memory, EEPROM for short), or a flash memory component, for example, a NOR flash memory (NOR flash memory) or a NAND flash memory (NAND flash memory). The nonvolatile memory stores an operating system and an application program executed by the processing unit. The processing unit loads a running program and data from the nonvolatile memory into a memory and stores digital content in a large-capacity storage apparatus. The operating system includes various components and/or drives that are used to control and manage a conventional system task, for example, memory management, storage device control or power management, and facilitate communication between various software and hardware. In an implementation manner of the present invention, the operating system may be an Android system of Google, an iOS system developed by Apple Inc., a Windows operating system developed by Microsoft, or an embedded operating system such as Vxworks.

The application program includes any application installed on the mobile terminal, including but not limited to a browser, an email, an instant message service, word processing, keyboard virtualization, a widget (Widget), encryption, digital copyright management, speech recognition, speech reproduction, positioning (for example, a function provided by a global positioning system), music playback, or the like.

The power supply 807 is configured to supply power to different parts of the mobile terminal to maintain running of the different parts. It is generally understood that the power supply 807 may be an internal battery, for example, a common lithium-ion battery or NiMH battery, and may further include an external power supply 807 that directly supplies power to the mobile terminal, for example, an AC adapter. In some implementation manners of the present invention, the power supply 807 may further have a broader definition, for example, may further include a management system of the power supply 807, a charging system, a fault detection circuit of the power supply 807, a converter or an inverter of the power supply 807, a status indicator (for example, a light emitting diode) of the power supply 807, and any other component related to power generation, management, and distribution of the mobile terminal.

Specifically, the processor unit 802 may implement the following by running or executing the software program and/or an application module stored in the storage unit 805 and by invoking the data stored in the storage unit 805:

storing a UUID, associated with at least one application program, of at least one signal transmitter device;

receiving a first broadcast message sent by a first signal transmitter device, where the first broadcast message includes a UUID of the first signal transmitter device;

sending, according to the UUID of the first signal transmitter device, request information to a first server corresponding to a first application program associated with the UUID of the first signal transmitter device, where the request information includes the UUID of the first signal transmitter device; and receiving and displaying a first notification message that is sent by the first server according to the request information.

In this embodiment of the present invention, a UUID, associated with at least one application program, of at least one signal transmitter device is stored; after a first broadcast message sent by a first signal transmitter device is received, request information is sent, according to a UUID of the first signal transmitter device in the broadcast message, to a first server corresponding to a first application program associated with the UUID of the first signal transmitter device, where the request information includes the UUID of the first signal transmitter device; and a first notification message sent by the first server according to the request information is received and displayed, so that in a case in which an application program has been purchased, a user can directly read push information and know the first notification message of a store without starting the application program or entering the application program. Therefore, the operation is simple and convenient.

Embodiment 9

Figure 15:
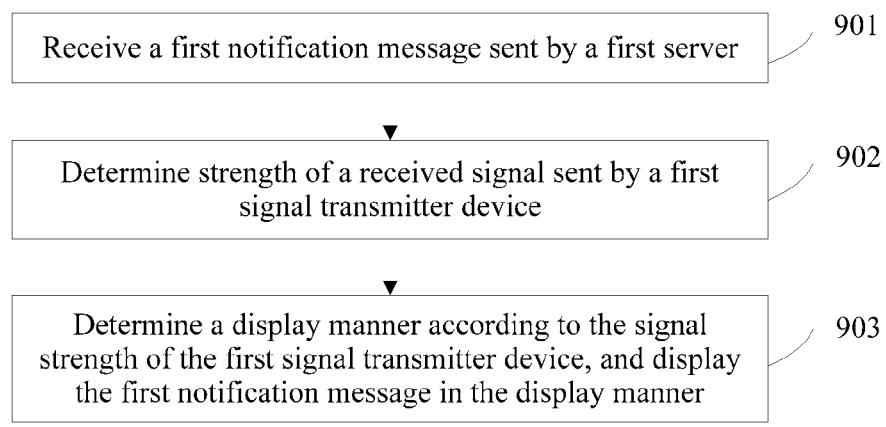
FIG. 15 is a flowchart of a message displaying method according to Embodiment 9 of the present invention.

This embodiment of the present invention provides a message displaying method. Referring to FIG. 15, the method includes:

Step 901: Receive a first notification message sent by a first server, where the first server is corresponding to an application program associated with a UUID of a first signal transmitter device.

In this embodiment, the first notification message is sent by the first server. There may be multiple forms of how a mobile terminal interacts with the first server to finally obtain the first notification message. The form in the foregoing Embodiment 1 or 2 may be used, or another form may be used.

Step 902: Determine strength of a received signal sent by the first signal transmitter device.

The signal strength of the first signal transmitter device may be signal strength that is between the first signal transmitter device and the mobile terminal and indicated in a broadcast message sent by the signal transmitter device. For details, reference may be made to Embodiment 1 or 2. Certainly, the signal strength may further be learned in another manner.

Step 903: Determine a display manner according to the signal strength of the first signal transmitter device, and display the first notification message in the display manner.

In this embodiment of the present invention, after a first notification message sent by a first server is received, strength of a received signal sent by a first signal transmitter device is determined, a display manner is determined according to the signal strength of the first signal transmitter device, and the first notification message is displayed in the display manner, so that in a case in which an application program has been purchased, a user can directly read push information and know the first notification message of a store without starting the application program or entering the application program. Therefore, the operation is simple and convenient. In addition, the display manner is determined according to the signal strength. Because a mapping relationship exists between the signal strength and a distance, different display manners can be provided for first notification messages sent by first servers at different distances, and the display manner is more diverse and targeted.

Embodiment 10

Figure 16:
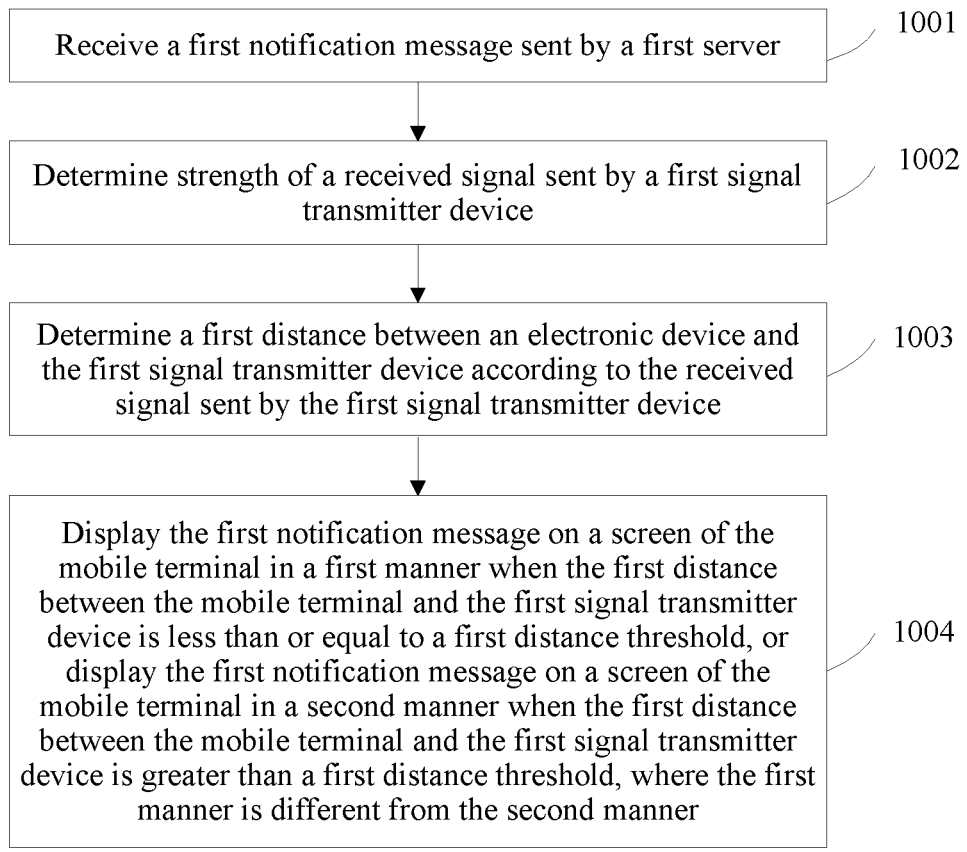
FIG. 16 is a flowchart of a message displaying method according to Embodiment 10 of the present invention.

This embodiment of the present invention provides a message displaying method. Referring to FIG. 16, the method includes:

Step 1001: Receive a first notification message sent by a first server, where the first server is corresponding to an application program associated with a UUID of a first signal transmitter device.

In this embodiment, the first notification message is sent by the first server. There may be multiple forms of how a mobile terminal interacts with the first server to finally obtain the first notification message. The form in the foregoing Embodiment 1 or 2 may be used, or another form may be used.

Step 1002: Determine strength of a received signal sent by the first signal transmitter device.

The signal strength of the first signal transmitter device may be signal strength that is between the first signal transmitter device and the mobile terminal and indicated in a broadcast message sent by the signal transmitter device. For details, reference may be made to Embodiment 1 or 2. Certainly, the signal strength may be learned in another manner.

Step 1003: Determine a first distance between a mobile terminal and the first signal transmitter device according to the strength of the received signal sent by the first signal transmitter device.

Step 1004: Display the first notification message on a screen of the mobile terminal in a first manner when the first distance between the mobile terminal and the first signal transmitter device is less than or equal to a first distance threshold, or display the first notification message on a screen of the mobile terminal in a second manner when the first distance between the mobile terminal and the first signal transmitter device is greater than a first distance threshold, where the first manner is different from the second manner.

In this embodiment, the first manner may be outputting both an application program icon and the first notification message; and the second manner may be outputting an application program icon, but not outputting the first notification message. In this case, for a specific display manner in step 1003, reference may be made to Embodiment 2, and details are not described herein.

Further, the method further includes:

receiving a second notification message sent by a second server, where the second server is corresponding to an application program associated with a UUID of a second signal transmitter device;

determining a second distance between the mobile terminal and the second signal transmitter device according to strength of a received signal sent by the second signal transmitter device;

determining a display manner of the second notification message according to the second distance between the mobile terminal and the second signal transmitter device; and when the display manner of the first notification message is the same as that of the second notification message, arranging display orders of the first notification message and the second notification message according to the first distance and the second distance, or arranging display orders of the first notification message and the second notification message according to receiving time of the first notification message and the second notification message.

Specifically, sorting according to the receiving time of the first notification message and the second notification message may be sorting the earlier received first notification message first, or sorting in a reverse order. Certainly, in addition to the sorting according to the receiving time of the first notification message, sorting may further be performed according to time for setting up a connection between the mobile terminal and a signal transmitter device. Sorting according to the first distance and the second distance may be preferably sorting a longer distance first, or sorting in a reverse order.

Further, the method further includes:

not displaying the first notification message on the screen of the mobile terminal when the first distance between the mobile terminal and the first signal transmitter device is greater than a second distance threshold, where the second distance threshold is greater than the first distance threshold, and the first distance threshold is greater than 0.

In this embodiment of the present invention, after a first notification message sent by a first server is received, strength of a received signal sent by a first signal transmitter device is determined, a display manner is determined according to the signal strength of the first signal transmitter device, and the first notification message is displayed in the display manner, so that in a case in which an application program has been purchased, a user can directly read push information and know the first notification message of a store without starting the application program or entering the application program. Therefore, the operation is simple and convenient. In addition, the display manner is determined according to the signal strength. Because a mapping relationship exists between the signal strength and a distance, different display manners can be provided for first notification messages sent by first servers at different distances, and the display manner is more diverse and targeted.

Embodiment 11

Figure 17:
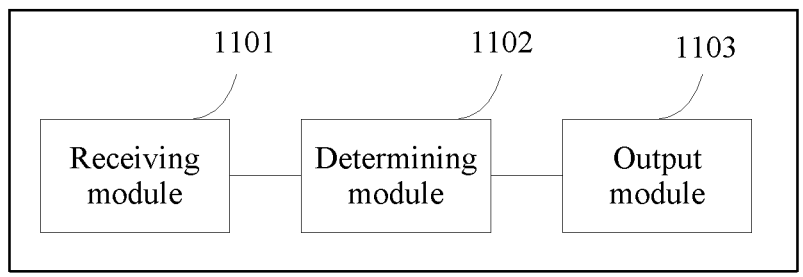
FIG. 17 is a block diagram of a message displaying apparatus according to Embodiment 11 of the present invention.

This embodiment of the present invention provides a message displaying apparatus. Referring to FIG. 17, the apparatus includes:

a receiving module 1101, configured to receive a first notification message sent by a first server, where the first server is corresponding to an application program associated with a UUID of a first signal transmitter device;

a determining module 1102, configured to determine strength of a received signal sent by the first signal transmitter device; and an output module 1103, configured to determine a display manner according to the signal strength of the first signal transmitter device, and display the first notification message in the display manner.

In this embodiment, the first notification message is sent by the first server. There may be multiple forms of how a mobile terminal interacts with the first server to finally obtain the first notification message. The form in the foregoing Embodiment 1 or 2 may be used, or another form may be used.

The signal strength of the first signal transmitter device may be signal strength that is between the first signal transmitter device and the mobile terminal and indicated in a broadcast message sent by the signal transmitter device. For details, reference may be made to Embodiment 1 or 2. Certainly, the signal strength may be learned in another manner.

In this embodiment of the present invention, after a first notification message sent by a first server is received, strength of a received signal sent by a first signal transmitter device is determined, a display manner is determined according to the signal strength of the first signal transmitter device, and the first notification message is displayed in the display manner, so that in a case in which an application program has been purchased, a user can directly read push information and know the first notification message of a store without starting the application program or entering the application program. Therefore, the operation is simple and convenient. In addition, the display manner is determined according to the signal strength. Because a mapping relationship exists between the signal strength and a distance, different display manners can be provided for first notification messages sent by first servers at different distances, and the display manner is more diverse and targeted.

Embodiment 12

Figure 18:
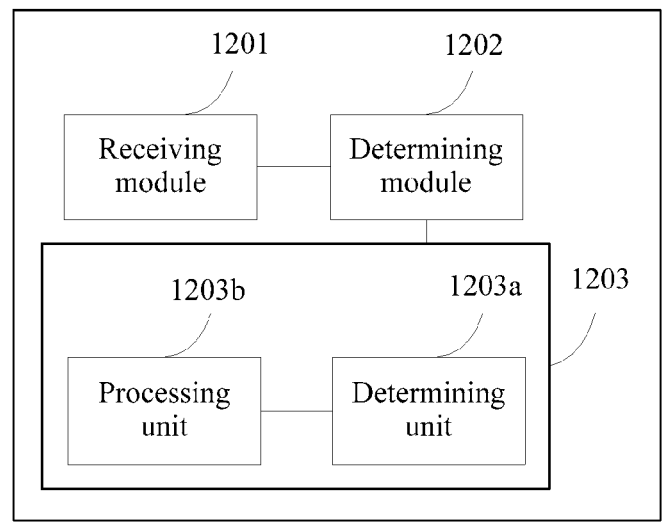
FIG. 18 is a block diagram of a message displaying apparatus according to Embodiment 12 of the present invention.

This embodiment of the present invention provides a message displaying apparatus. Referring to FIG. 18, the apparatus includes:

a receiving module 1201, configured to receive a first notification message sent by a first server, where the first server is corresponding to an application program associated with a UUID of a first signal transmitter device;

a determining module 1202, configured to determine strength of a received signal sent by the first signal transmitter device; and an output module 1203, configured to determine a display manner according to the signal strength of the first signal transmitter device, and display the first notification message in the display manner.

In this embodiment, the first notification message is sent by the first server. There may be multiple forms of how a mobile terminal interacts with the first server to finally obtain the first notification message. The form in the foregoing Embodiment 1 or 2 may be used, or another form may be used.

The signal strength of the first signal transmitter device may be signal strength that is between the first signal transmitter device and the mobile terminal and indicated in a broadcast message sent by the signal transmitter device. For details, reference may be made to Embodiment 1 or 2. Certainly, the signal strength may be learned in another manner.

In this embodiment, the output module 1203 includes:

a determining unit 1203a, configured to determine a first distance between a mobile terminal and the first signal transmitter device according to the strength of the received signal sent by the first signal transmitter device; and a processing unit 1203b, configured to: display the first notification message on a screen of the mobile terminal in a first manner when the first distance between the mobile terminal and the first signal transmitter device is less than or equal to a first distance threshold, or display the first notification message on a screen of the mobile terminal in a second manner when the first distance between the mobile terminal and the first signal transmitter device is greater than a first distance threshold, where the first manner is different from the second manner.

In this embodiment, the first manner may be outputting both an application program icon and the first notification message; and the second manner may be outputting an application program icon, but not outputting the first notification message. In this case, for a specific display manner in the process of the output module 1203, reference may be made to Embodiment 2, and details are not described herein.

Further, the receiving module 1201 is further configured to receive a second notification message sent by a second server, where the second server is corresponding to an application program associated with a UUID of a second signal transmitter device.

The determining unit 1203a is further configured to determine a second distance between the mobile terminal and the second signal transmitter device according to strength of a received signal sent by the second signal transmitter device.

The processing unit 1203b is further configured to: determine a display manner of the second notification message according to the second distance between the mobile terminal and the second signal transmitter device, and when the display manner of the first notification message is the same as that of the second notification message, arrange display orders of the first notification message and the second notification message according to the first distance and the second distance, or arrange display orders of the first notification message and the second notification message according to receiving time of the first notification message and the second notification message.

Specifically, sorting according to the receiving time of the first notification message and the second notification message may be sorting the earlier received first notification message first, or sorting in a reverse order. Certainly, in addition to the sorting according to the receiving time of the first notification message, sorting may further be performed according to time for setting up a connection between the mobile terminal and a signal transmitter device. Sorting according to the first distance and the second distance may be preferably sorting a longer distance first, or sorting in a reverse order.

Further, the processing unit 1203b is further configured to: not display the first notification message on the screen of the mobile terminal when the first distance between the mobile terminal and the first signal transmitter device is greater than a second distance threshold, where the second distance threshold is greater than the first distance threshold, and the first distance threshold is greater than 0.

In this embodiment of the present invention, after a first notification message sent by a first server is received, strength of a received signal sent by a first signal transmitter device is determined, a display manner is determined according to the signal strength of the first signal transmitter device, and the first notification message is displayed in the display manner, so that in a case in which an application program has been purchased, a user can directly read push information and know the first notification message of a store without starting the application program or entering the application program. Therefore, the operation is simple and convenient. In addition, the display manner is determined according to the signal strength. Because a mapping relationship exists between the signal strength and a distance, different display manners can be provided for first notification messages sent by first servers at different distances, and the display manner is more diverse and targeted.

Embodiment 13

Figure 19:
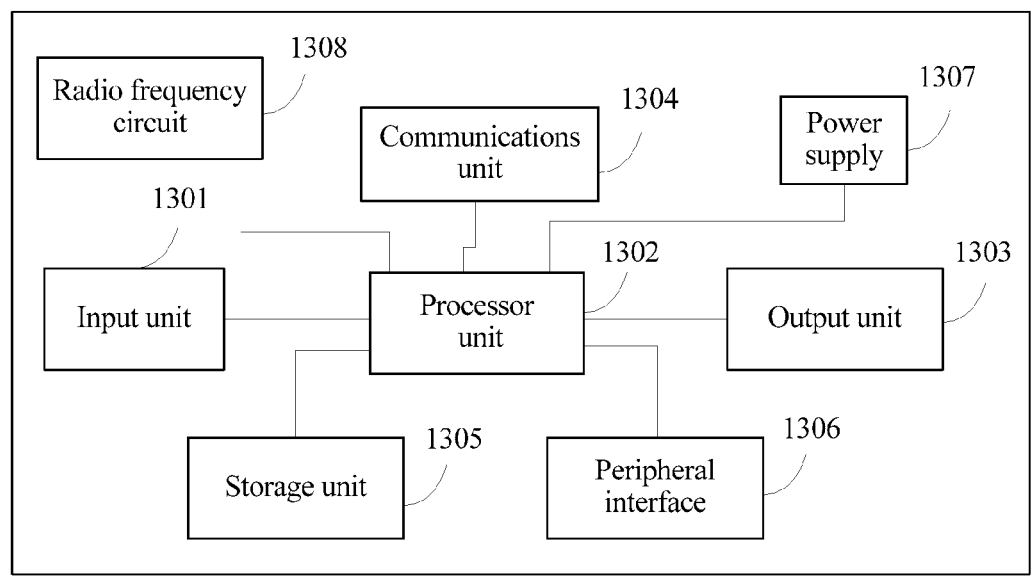
FIG. 19 is a block diagram of a message displaying apparatus according to Embodiment 13 of the present invention.

This embodiment of the present invention provides a message pushing apparatus. FIG. 19 is a block diagram of a message pushing apparatus 1300 shown according to an exemplary embodiment. Referring to FIG. 19, the apparatus 1300 may include one or more of the following components:

an input unit 1301, a processor unit 1302, an output unit 1303, a communications unit 1304, a storage unit 1305, a peripheral interface 1306, a power supply 1307, a radio frequency circuit 1308, or the like. These components communicate with each other by using one or more buses. A person skilled in the art may understand that a structure of the mobile terminal shown in this figure does not constitute any limitation to the present invention, and instead the mobile terminal may be a bus structure, or a star structure, and may further include parts fewer or more than those shown in this figure, or a combination of some parts, or parts disposed differently. In an implementation manner of the present invention, the apparatus 1300 may be any portable mobile terminal, including but not limited to a mobile phone, a mobile computer, a tablet computer, a personal digital assistant (Personal Digital Assistant, PDA), a media player, a smart television, a smart watch, smart glasses, a smart band, or the like.

The input unit 1301 is configured to implement interaction between a user and the mobile terminal, and/or input information into the mobile terminal. For example, the input unit 1301 may receive digit or character information that is input by a user, to generate signal input related to user configuration or function control. In a specific implementation manner of the present invention, the input unit 1301 may be a touch panel, or may be another human-machine interaction interface, for example, a substantive input key or a microphone, or may be another external-information capture apparatus, for example, a camera. The touch panel is also referred to as a touchscreen, and may collect a touch or proximity operation of a user on the touch panel. For example, a user uses any appropriate object or accessory, such as, a finger or a stylus, to perform an operation on the touch panel or in a position of proximity to the touch panel and drive a corresponding connection apparatus according to a preset program. Optionally, the touch panel may include two parts: a touch detection apparatus and a touch controller. The touch detection apparatus detects a touch operation of a user, converts the detected touch operation into an electrical signal, and transmits the electrical signal to the touch controller. The touch controller receives the electrical signal from the touch detection apparatus, converts the electrical signal into contact coordinates, and then sends to the processing unit. The touch controller may further receive and execute a command sent by the processing unit. In addition, the touch panel may be implemented in multiple types such as a resistive type, a capacitive type, an infrared (Infrared) type, and a surface acoustic wave type. In another implementation manner of the present invention, the substantive input key used by the input unit 1301 may include but is not limited to one or more of a physical keyboard, a function key (for example, a volume control button or a power on/off button), a trackball, a mouse, a joystick, or the like. The input unit 1301 in a microphone form may collect a voice that is input by a user or an environment and convert the voice into a command that is in an electrical signal form and can be executed by the processing unit.

The processor unit 1302 is a control center of the mobile terminal, connects to all parts of the entire mobile terminal by using various interfaces and lines, and executes various functions of the mobile terminal and/or processes data by running or executing a software program and/or a module stored in the storage unit 1305 and by invoking data stored in the storage unit 1305. The processor unit 1302 may include an integrated circuit (Integrated Circuit, IC for short), for example, may include a singly-encapsulated IC or may include multiple connected encapsulated ICs with a same function or different functions. For example, the processor unit 1302 may include only a central processing unit (Central Processing Unit, CPU for short), or may be a combination of a CPU, a digital signal processor (digital signal processor, DSP for short), a graphic processing unit (Graphic Processing Unit, GPU for short), and a control chip (for example, a baseband chip) in the communications unit 1304. In an implementation manner of the present invention, the CPU may be a single operating core, or may include multiple operating cores.

The communications unit 1304 is configured to set up a communication channel, so that the mobile terminal is connected to a communication peer end by using the communication channel and exchanges data with the communication peer end by using the communication channel. The communications unit 1304 may include a wireless communications module such as a wireless local area network (Wireless Local Area Network, wireless LAN for short) module, a Bluetooth module, a near field communication (Near Field Communication, NFC for short) module, or a baseband (Base Band) module, and a wired communications module such as the Ethernet, a Universal Serial Bus (Universal Serial Bus, USB for short), or a lightning interface (Lightning, currently used by Apple Inc. in a device such as an iPhone5/5s/5c). The communications module is configured to perform communication between each component in the mobile terminal and the communication peer end, and may support direct memory access (Direct Memory Access).

In different implementation manners of the present invention, various communications modules in the communications unit 1304 generally appear in a form of an integrated circuit chip (Integrated Circuit Chip), and may be combined selectively without including all communications modules. For example, the communications unit 1304 may include only a baseband chip, a radio frequency chip, and a corresponding antenna, to provide a communication function in a cellular communications system. The mobile terminal may be connected to a cellular network (Cellular Network) or the Internet (Internet) through a wireless communications connection, for example, wireless local area network access or WCDMA access, set up by the communications unit 1304. In some optional implementation manners of the present invention, the communications module in the communications unit 1304, for example, the baseband module, may be integrated into the processor unit 1302, typically for example, an APQ+MDM series platform provided by Qualcomm (Qualcomm) Inc.

The radio frequency circuit 1308 is configured to receive and send information or receive and send a signal during a call. For example, after receiving downlink information from a base station, the radio frequency circuit 1308 sends the downlink information to the processing unit for processing. In addition, the radio frequency circuit 1308 sends designed uplink data to a base station. Generally, the radio frequency circuit 1308 includes a well-known circuit configured to perform these functions, which includes but is not limited to an antenna system, a radio frequency transceiver, one or more amplifiers, a tuner, one or more oscillators, a digital signal processor, a codec (Codec) chipset, a subscriber identity module (SIM) card, a memory, or the like. In addition, the radio frequency circuit 1308 may further communicate with a network and another device by means of wireless communications. The wireless communications may use any communications standard or protocol, including but not limited to GSM (Global System of Mobile communication, Global System for Mobile communications), GPRS (General Packet Radio Service, General Packet Radio Service), CDMA (Code Division Multiple Access, Code Division Multiple Access), WCDMA (Wideband Code Division Multiple Access, Wideband Code Division Multiple Access), a High Speed Uplink Packet Access (High Speed Uplink Packet Access, HSUPA) technology, LTE (Long Term Evolution, Long Term Evolution), Long Term Evolution Advanced (LTE-Advanced), or the like.

The output unit 1303 may include but is not limited to an image output unit, an audio output unit, and a tactile output unit. The image output unit is configured to output a text, a picture, and/or video. The image output unit may include a display panel, for example, a display panel configured in a form of an LCD (Liquid Crystal Display, liquid crystal display), an OLED (Organic Light-Emitting Diode, organic light-emitting diode), a field emission display (field emission display, FED for short), or the like. Alternatively, the image output unit may include a reflective display, for example, an electrophoretic (electrophoretic) display, or a display using an interferometric modulation of light (Interferometric Modulation of Light) technology. The image output unit may include a single display or multiple displays in different sizes. In a specific implementation manner of the present invention, the touch panel used by the input unit 1301 may also be used as a display panel of the output unit 1303. For example, after detecting a touch or proximity gesture operation on the touch panel, the touch panel transmits the gesture operation to the processing unit to determine a touch event type, and then the processing unit provides corresponding visual output on the display panel according to the touch event type. In FIG. 19, the input unit 1301 and the output unit 1303 are used as two independent parts to implement input and output functions of the mobile terminal; however, in some embodiments, the touch panel and the display panel may be integrated to implement input and output functions of the mobile terminal. For example, the image output unit may display various graphical user interfaces (Graphical User Interface, GUI for short) as virtual control components, including but not limited to a window, a scroll bar, an icon, and a clipboard, so that a user performs an operation in a touch manner.

In a specific implementation manner of the present invention, the image output unit includes a filter and an amplifier, configured to filter and amplify video that is output by the processing unit. The audio output unit includes a digital-to-analog converter, configured to convert an audio signal, output by the processing unit, from a digital format to an analog format.

The storage unit 1305 may be configured to store the software program and the module. By running the software program and the module that are stored in the storage unit 1305, the processing unit executes various functional applications of the mobile terminal and implements data processing. The storage unit 1305 mainly includes a program storage area and a data storage area, where the program storage area may be used to store an operating system, an application program required by at least one function, for example, an audio playback program or an image playback program; and the data storage area may be used to store data (for example, audio data and a phone book) created according to use of the mobile terminal, and the like. In a specific implementation manner of the present invention, the storage unit 1305 may include a volatile memory, for example, a dynamic nonvolatile random access memory (Nonvolatile Random Access Memory, NVRAM for short), a phase change random access memory (Phase Change RAM, PRAM for short), or a magnetoresistive random access memory (Magetoresistive RAM, MRAM for short), or may include a nonvolatile memory, for example, at least one magnetic disk storage component, an electrically erasable programmable read-only memory (Electrically Erasable Programmable Read-Only Memory, EEPROM for short), or a flash memory component, for example, a NOR flash memory (NOR flash memory) or a NAND flash memory (NAND flash memory). The nonvolatile memory stores an operating system and an application program executed by the processing unit. The processing unit loads a running program and data from the nonvolatile memory into a memory and stores digital content in a large-capacity storage apparatus. The operating system includes various components and/or drives that are used to control and manage a conventional system task, for example, memory management, storage device control or power management, and facilitate communication between various software and hardware. In an implementation manner of the present invention, the operating system may be an Android system of Google, an iOS system developed by Apple Inc., a Windows operating system developed by Microsoft, or an embedded operating system such as Vxworks.

The application program includes any application installed on the mobile terminal, including but not limited to a browser, an email, an instant message service, word processing, keyboard virtualization, a widget (Widget), encryption, digital copyright management, speech recognition, speech reproduction, positioning (for example, a function provided by a global positioning system), music playback, or the like.

The power supply 1307 is configured to supply power to different parts of the mobile terminal to maintain running of the mobile terminal. It is generally understood that the power supply 1307 may be an internal battery, for example, a common lithium-ion battery or NiMH battery, and may further include an external power supply 1307 that directly supplies power to the mobile terminal, for example, an AC adapter. In some implementation manners of the present invention, the power supply 1307 may further have a broader definition, for example, may further include a management system of the power supply 1307, a charging system, a fault detection circuit of the power supply 1307, a converter or an inverter of the power supply 1307, a status indicator (for example, a light emitting diode) of the power supply 1307, and any other component related to power generation, management, and distribution of the mobile terminal.

Specifically, the processor unit 1302 may implement the following by running or executing the software program and/or an application module stored in the storage unit 1305 and by invoking the data stored in the storage unit 1305:

receiving a first notification message sent by a first server, where the first server is corresponding to an application program associated with a UUID of a first signal transmitter device;

determining strength of a received signal sent by the first signal transmitter device; and determining a display manner according to the signal strength of the first signal transmitter device, and displaying the first notification message in the display manner.

It should be noted that when the message pushing apparatus and the message pushing method provided in the foregoing embodiments are used to push a message, division of the foregoing function modules is merely taken as an example for illustration. In actual application, according to a requirement, the foregoing functions can be allocated to different function modules and implemented, that is, an inner structure of a device is divided into different function modules to implement all or part of the functions described above. In addition, the embodiments of the message pushing apparatus and the embodiments of the message pushing method that are provided in the foregoing embodiments belong to a same concept. For a specific implementation process of the apparatus embodiments, reference may be made to the method embodiments, and details are not described herein.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A message displaying method, wherein the method comprises:
receiving a first notification message sent by a first server, wherein the first server is corresponding to a first application program associated with a universally unique identifier of a first signal transmitter device;
determining strength of a received signal sent by the first signal transmitter device;
determining, by the mobile terminal, a first distance between a mobile terminal and the first signal transmitter device based on the strength of the received signal;
selecting a display manner for the first notification message based on a comparison between the first distance and a first distance threshold, wherein the selecting the display manner comprises:
selecting a first manner in response to determining that the first distance between the mobile terminal and the first signal transmitter device is less than the first distance threshold, wherein the first manner comprises outputting an indication of the first application program and a notification message on a lock screen interface of the mobile terminal; or
selecting a second manner in response to determining that the first distance between the mobile terminal and the first signal transmitter device is greater than the first distance threshold, wherein the second manner is different than the first manner and the second manner comprises outputting the indication of the first application program on the lock screen interface of the mobile terminal without outputting the notification message; and
displaying the first notification message using the selected display manner.

2. The method according to claim 1, wherein the method further comprises:
receiving a second notification message sent by a second server, wherein the second server is corresponding to a second application program associated with a second universally unique identifier of a second signal transmitter device;
determining a second distance between the mobile terminal and the second signal transmitter device according to a received signal sent by the second signal transmitter device;
determining a second display manner for the second notification message according to the second distance between the mobile terminal and the second signal transmitter device, wherein the second display manner is same as the first display manner; and
arranging display orders of the first notification message and the second notification message according to the first distance and the second distance.

3. The method according to claim 1, wherein the method further comprises:
determining that the first distance between the mobile terminal and the first signal transmitter device is less than a second distance threshold, wherein the second distance threshold is greater than the first distance threshold; and
wherein the first notification message is displayed in response to the determining that the first distance between the mobile terminal and the first signal transmitter device is less than the second distance threshold.

4. A message displaying apparatus, wherein the apparatus comprises a processor, a non-transitory computer-readable memory, a communications unit, an output unit, and a bus; the non-transitory computer-readable memory is configured to store computer execution instructions; the processor, and the non-transitory computer-readable memory are connected by the bus; and the computer execution instructions, when executed, cause the processor to:
receive a first notification message sent by a first server, wherein the first server is corresponding to a first application program associated with a universally unique identifier of a first signal transmitter device;
determine strength of a received signal sent by the first signal transmitter device; and
determine a first distance between a mobile terminal and the first signal transmitter device based on the strength of the received signal;
select a display manner for the first notification message based on a comparison between the first distance and a first distance threshold, wherein the selecting the display manner comprises:
selecting a first manner in response to determining that the first distance between the mobile terminal and the first signal transmitter device is less than the first distance threshold, wherein the first manner comprises outputting an indication of the first application program and a notification message on a lock screen interface of the mobile terminal; or
selecting a second manner in response to determining that the first distance between the mobile terminal and the first signal transmitter device is greater than the first distance threshold, wherein the second manner is different than the first manner and the second manner comprises outputting the indication of the first application program on the lock screen interface of the mobile terminal without outputting the notification message; and
display the first notification message using the selected display manner.

5. The message displaying apparatus according to claim 4, wherein the computer execution instructions, when executed, cause the processor to:
receive a second notification message sent by a second server, wherein the second server is corresponding to a second application program associated with a second universally unique identifier of a second signal transmitter device;

determine a second distance between the mobile terminal and the second signal transmitter device according to a received signal sent by the second signal transmitter device;

determine a second display manner for the second notification message according to the second distance between the mobile terminal and the second signal transmitter device, wherein the second display manner is same as the first display manner; and arrange display orders of the first notification message and the second notification message according to the first distance and the second distance.

6. The message displaying apparatus according to claim 4, wherein the computer execution instructions, when executed, cause the processor to:

determine that the first distance between the mobile terminal and the first signal transmitter device is less than a second distance threshold, wherein the second distance threshold is greater than the first distance threshold; and wherein the first notification message is displayed in response to the determining that the first distance between the mobile terminal and the first signal transmitter device is less than the second distance threshold.

7. The method according to claim 1, wherein the universally unique identifier identifies an enterprise or a store associated with the first signal transmitter device.

8. The message displaying apparatus according to claim 4, wherein the universally unique identifier identifies an enterprise or a store associated with the first signal transmitter device.

* * * * *